(12) United States Patent
Lin et al.

(10) Patent No.: US 8,220,513 B1
(45) Date of Patent: Jul. 17, 2012

(54) LAMINATOR WITH CHANGEABLE ROTATION SPEED AND HEATING TEMPERATURE

(75) Inventors: Chih-Hsun Lin, Taipei (TW); Yen-Te Lee, Taipei (TW); Qi-Feng Zou, Taipei (TW)

(73) Assignee: Primax Electronics Ltd., Taipei (TW)

( * ) Notice: Subject to any disclaimer, the term of this patent is extended or adjusted under 35 U.S.C. 154(b) by 0 days.

(21) Appl. No.: 13/342,651

(22) Filed: Jan. 3, 2012

(30) Foreign Application Priority Data

Aug. 24, 2011 (CN) .......................... 2011 1 0265794

(51) Int. Cl.
*B32B 37/00* (2006.01)
(52) U.S. Cl. ...... 156/358; 156/555; 156/582; 156/583.1
(58) Field of Classification Search .................. 156/351, 156/358, 555, 580, 582, 583.1
See application file for complete search history.

(56) References Cited

U.S. PATENT DOCUMENTS

| | | | |
|---|---|---|---|
| 6,874,555 B1 * | 4/2005 | Hsiao | 156/555 |
| 7,406,993 B2 * | 8/2008 | Lin | 156/555 |
| 7,556,077 B2 * | 7/2009 | Chou | 156/555 |
| 8,136,565 B2 * | 3/2012 | Pan et al. | 156/555 |

* cited by examiner

*Primary Examiner* — James Sells
(74) *Attorney, Agent, or Firm* — Kirton McConkie; Evan R. Witt

(57) ABSTRACT

The present invention relates to a laminator with changeable rotation speed and heating temperature including a first roller set, a second roller set, a transmission gear set, a speed changing gear set, a first driving device, a second driving device, an input interface, a controller and a heating device. A user selects an option of the input interface according to film thickness. The controller determines rotation speed and heating temperature of the first roller set and the second roller set according to the option. Then the controller controls the second driving device to move the speed changing gear set to alter the engagement between the speed changing gear set and the transmission gear set, as to modulate the rotational speed of the first roller set and the second roller set.

23 Claims, 16 Drawing Sheets

LAMINATOR WITH CHANGEABLE ROTATION SPEED AND HEATING TEMPERATURE

FIELD OF THE INVENTION

The present invention generally relates to a laminator, and more particularly to a laminator with changeable rotation speed and heating temperature.

BACKGROUND OF THE INVENTION

A laminator is a kind of common office machines for laminating two films and an object, such as a photo or a business card, disposed between the two films. After the two films and the object disposed between the two films pass through a roller set inside the laminator, the object is sealed between the two films, so as to reduce the probability of the object being damaged and thus increase the storage life of the object. It should be noted that the films provided by different suppliers may have various thicknesses, and the thicker films need more heat energy for laminating during a heat laminating process. Therefore, with the film thicknesses increasing, the laminator needs to reduce a rotational speed of the roller set for increasing a time of the films receiving the heat energy, or increase a heating temperature of the roller set, and thus the films are capable of receiving more heat energy at the same time. In order to apply to the films with various thicknesses, a laminator with a rotational speed adjusting function or a heating temperature adjusting function becomes commercially available.

For example, the U.S. Pat. No. 7,556,077 discloses a laminator with a rotational speed adjusting function. Referring to FIG. 1A to FIG. 1C together, wherein FIG. 1A illustrates a side view of the laminator with changeable rotation speed of the U.S. Pat. No. 7,556,077 at a first rotational speed status, FIG. 1B illustrates a side view of the laminator with changeable rotation speed of the U.S. Pat. No. 7,556,077 at a second rotational speed status, and FIG. 1C illustrates a side view of the laminator with changeable rotation speed of the U.S. Pat. No. 7,556,077 at a third rotational speed status.

The laminator 1 comprises a driving device 11, a driving gear wheel set 12, a transmission gear set 13, a first roller 14, a second roller 15 and an adjusting device 16. Herein, the driving gear wheel set 12 comprises a first driving gear wheel 12a, a second driving gear wheel 12b, a third driving gear wheel 12c and a first shaft 12d. In addition, the transmission gear set 13 comprises a first transmission gear wheel 13a, a second transmission gear wheel 13b, a third transmission gear wheel 13c and a second shaft 13d. Furthermore, the first roller 14 comprises a first gear wheel 14a. Moreover, the second roller 15 comprises a second gear wheel 15a. Besides, the adjusting device 16 comprises a frame 16a and an adjusting rod 16b.

Herein, the first shaft 12d connects with the driving device 11. Moreover, the first driving gear wheel 12a, the second driving gear wheel 12b and the third driving gear wheel 12c pass through the first shaft 12d respectively, wherein a diameter of the third driving gear wheel 12c is larger than a diameter of the first driving gear wheel 12a, and a diameter of the first driving gear wheel 12a is larger than a diameter of the second driving gear wheel 12b. Furthermore, the second shaft 13d is disposed over the first shaft 12d. In addition, the first transmission gear wheel 13a, the second transmission gear wheel 13b and the third transmission gear wheel 13c pass through the second shaft 13d respectively, wherein a diameter of the second transmission gear wheel 13b is larger than a diameter of the first transmission gear wheel 13a, and a diameter of the first transmission gear wheel 13a is larger than a diameter of the third transmission gear wheel 13c. Before the first transmission gear wheel 13a moves along the second shaft 13d to engage with the second transmission gear wheel 13b or the third transmission gear wheel 13c, neither the second transmission gear wheel 13b nor the third transmission gear wheel 13c is able to drive the second shaft 13d to rotate. Moreover, the first gear wheel 14a is disposed at an end of the first roller 14, and the end of the first roller 14 connects with the second shaft 13d. In addition, the second roller 15 is disposed over the first roller 14, the second gear wheel 15a is disposed at an end of the second roller 15, and the second gear wheel 15a engages with the first gear wheel 14a. Furthermore, the frame 16a surrounds the first transmission gear wheel 13a, while the adjusting rod 16b is located over the frame 16a for moving the frame 16a.

An operating process of the laminator 1 is illustrated herein after. Referring to FIG. 1A first, before a user moves the adjusting rod 16b, the first transmission gear wheel 13a engages with the first driving gear wheel 12a. When the driving device 11 is activated, it brings the first shaft 12d and the first driving gear wheel 12a to rotate and thereby brings the first transmission gear wheel 13a and the second shaft 13d to rotate. Therefore, the first roller 14 and the first gear wheel 14a rotate with the second shaft 13d simultaneously. At the moment, the first gear wheel 14a rotates and thereby brings the second gear wheel 15a engaging with the first gear wheel 14a to rotate, and thus the first roller 14 and the second roller 15 simultaneously rotate with a first rotational speed. After that, the user is able to put two films with a first thickness and an object disposed between the two films inside the laminator, and thus the two films with the first thickness and the object disposed between the two films pass through the first roller 14 and the second roller 15, so as to seal the object between the two films with the first thickness.

When the user desires to seal the object between two films with a second thickness, and the second thickness is larger than the first thickness, the first roller 14 and the second roller 15 need to rotate with a lower rotational speed. Therefore, the user must to move the adjusting rod 16b leftward, and thus the frame 16a pushes the first transmission gear wheel 13a leftward to engage with the second transmission gear wheel 13b. At the time, the second transmission gear wheel 13b is unable to rotate relative to the second shaft 13d. After the driving device 11 is activated, the driving device 11 brings the first shaft 12d and the second driving gear wheel 12b to rotate and thereby brings the second transmission gear wheel 13b and the second shaft 13d to rotate, and thus the first roller 14 and the second roller 15 simultaneously rotate with a second rotational speed.

Since a diameter of the second driving gear wheel 12b is smaller than a diameter of the second transmission gear wheel 13b, and a diameter of the second driving gear wheel 12b is smaller than a diameter of the first driving gear wheel 12a, the required number of circles that the second driving gear wheel 12b rotates is more than that the first driving gear wheel 12a rotates in order to drive the second transmission gear wheel 13b to rotate one circle, and thus the second rotational speed is lower than the first rotational speed.

In contrast, when the user desires to seal the object between two films with a third thickness, and the third thickness is smaller than the first thickness, the first roller 14 and the second roller 15 need to rotate with a higher rotational speed. Thus, the user must to move the adjusting rod 16b rightward, and thus the frame 16a pushes the first transmission gear wheel 13a rightward to engage with the third transmission gear wheel 13c. At the time, the third transmission gear wheel 13c is unable to rotate relative to the second shaft 13d. After the driving device 11 is activated, the driving device 11 brings the first shaft 12d and the third driving gear wheel 12c to rotate and thereby brings the third transmission gear wheel 13c and the second shaft 13d to rotate, and thus the first roller 14 and the second roller 15 simultaneously rotate with a third rotational speed.

Since a diameter of the third driving gear wheel 12c is larger than a diameter of the third transmission gear wheel 13c, and a diameter of the third driving gear wheel 12c is larger than a diameter of the first driving gear wheel 12a, the number of circles that the third transmission gear wheel 13c being driven to rotate when the third driving gear wheel 12c rotates one circle is more than when the first driving gear wheel 12a rotates one circle, and thus the third rotational speed is higher than the first rotational speed.

According to a summary of the above mentioned descriptions, it is understood that the conventional laminator 1 provides a combination of the driving device 11, the driving gear wheel set 12, the transmission gear set 13, the first gear wheel 14a, the second gear wheel 15a and the adjusting device 16, and thus the first roller 14 and the second roller 15 can rotate with three different rotational speeds according to different film thicknesses.

It should be noted that the laminator disclosed in the above mentioned U.S. Pat. No. 7,556,077 has following disadvantages. The first disadvantage is that the user need to push the adjusting rod leftward or rightward for moving the first transmission gear wheel when the rotational speed of the first roller and the second roller is required to be adjusted. However, in a long term use, the adjusting rod is probably damaged or even fractured by the external force, and thus the conventional laminator is unable to adjust the rotational speed any more.

Besides, the laminator disclosed in the U.S. Pat. No. 7,556,077 does not have a function of adjusting heating temperature. Hence, no matter how the film thickness is, the heating device needs to heat the first roller and the second roller to the same heating temperature. Therefore, the laminator is in an environment with a high temperature for a long period during being operated, and thus a probability of melt damage is increased. In addition, when the thickness of the film required to be laminated is thinner, the user needs to wait for the same heating time as laminating a thicker film, and thus it is quite inconvenient to the user.

Accordingly, it is desired to provide an improved laminator for overcoming the disadvantages of the conventional laminator.

SUMMARY OF THE INVENTION

The present invention is directed to a laminator capable of automatically changing the rotation speed and the heating temperature according to a film thickness.

The present invention is further directed to provide a laminator with changeable rotation speed and heating temperature capable of laminating two films and an object disposed between the two films together, wherein the laminator comprises:
 a first roller set, capable of clipping and delivering the two films and the object, so as to laminate the two films and the object together;
 a transmission gear set, connected with the first roller set;
 a speed changing gear set, connected with the transmission gear set;
 a first driving device, connected with the speed changing gear set and capable of providing a motive power to the first roller set;
 a second driving device, connected with the speed changing gear set and capable of moving the speed changing gear set to a plurality of speed changing positions, so as to rotate the first roller set with a plurality of rotational speeds;
 a heating device, capable of heating the first roller set; an input interface, having a plurality of heat treatment options capable of being selected; and
 a controller, the controller comprising a plurality of parameter groups, each of the parameter groups corresponding to a plurality of the heat treatment options, each of the parameter groups corresponding to a laminating rotational speed and a laminating heating temperature range of the first roller set, each of the parameter groups corresponding to the same laminating heating temperature range of the first roller set, each of the heat treatment options corresponding to a laminating heating temperature within the laminating heating temperature range, wherein the controller controls the heating device heating the first roller set to one of the laminating heating temperatures within the laminating heating temperature range corresponding to a selected one of the heat treatment options and drives the second driving device to move the speed changing gear set to one of the speed changing positions, so as to rotate the first roller set with one of the laminating rotational speeds corresponding to the selected one of the heat treatment options, and the plurality of heat treatment options of each of the parameter groups respectively correspond to the different laminating heating temperatures within the laminating heating temperature range.

In a preferred embodiment, each of the heat treatment options corresponds to a film thickness.

In a preferred embodiment, the controller comprises a first parameter group and a second parameter group, and numbers of the heat treatment options that the first parameter group and the second parameter group respectively corresponding to are the same, wherein the first parameter group corresponds to a first laminating rotational speed of the first roller set, the second parameter group corresponds to a second laminating rotational speed of the first roller set, and the first laminating rotational speed is larger than the second laminating rotational speed.

In a preferred embodiment, the input interface further comprises a cold treatment option, and the cold treatment option corresponds to the first laminating rotational speed of the first roller set.

In a preferred embodiment, the first roller set comprises two first rollers and a first gear wheel.

In a preferred embodiment, the laminator further comprises a second roller set capable of clipping and delivering the two films and the object coming from the first roller set, wherein the second roller set comprises two second rollers and a second gear wheel.

In a preferred embodiment, the first driving device comprises a driving gear wheel.

In a preferred embodiment, the second driving device comprises a first connecting component and a second connecting component, wherein a first end of the first connecting component is pivoted to the second driving device, a second end of the first connecting component passes through a first end of the second connecting component, and a second end of the second connecting component connects with the speed changing gear set.

In a preferred embodiment, the transmission gear set comprises a first transmission gear wheel, a second transmission gear wheel and a first shaft, wherein a diameter of the second transmission gear wheel is larger than a diameter of the first transmission gear wheel, the first transmission gear wheel and the second transmission gear wheel respectively pass through two ends of the first shaft, and the second transmission gear wheel engages with the first gear wheel and the second gear wheel.

In a preferred embodiment, the speed changing gear set comprises a first speed changing gear wheel, a second speed changing gear wheel and a second shaft, wherein a diameter of the first speed changing gear wheel is larger than a diameter of the second speed changing gear wheel, the first speed changing gear wheel and the second speed changing gear wheel pass through the second shaft, and the first speed changing gear wheel engages with the driving gear wheel of the first driving device.

In a preferred embodiment, when the second driving device moves the speed changing gear set to a first speed changing position, the first speed changing gear wheel engages with the first transmission gear wheel, and the first roller set and the second roller set rotate with the first laminating rotational speed. In contrast, when the second driving device moves the speed changing gear set to a second speed changing position, the second speed changing gear wheel engages with the second transmission gear wheel, and the first roller set and the second roller set rotate with the second laminating rotational speed.

In a preferred embodiment, the laminator further comprises a first sensor capable of sensing whether the speed changing gear set is moved to the first speed changing position or not, and a second sensor capable of sensing whether the speed changing gear set is moved to the second speed changing position or not.

In a preferred embodiment, a side edge of each of teeth of the first transmission gear wheel, the second transmission gear wheel, the first speed changing gear wheel and the second speed changing gear wheel further comprises two chamfers, so as to smoothly engage the first speed changing gear wheel and the second speed changing gear wheel with the first transmission gear wheel and the second transmission gear wheel.

In another preferred embodiment, the controller comprises a first parameter group, a second parameter group and a third parameter group, and numbers of the heat treatment options that the first parameter group, the second parameter group and the third parameter group respectively corresponding to are the same, wherein the first parameter group corresponds to a first laminating rotational speed of the first roller set, the second parameter group corresponds to a second laminating rotational speed of the first roller set, the third parameter group corresponds to a third laminating rotational speed of the first roller set. Herein, the first laminating rotational speed is larger than the second laminating rotational speed, and the second laminating rotational speed is larger than the third laminating rotational speed.

In another preferred embodiment, the input interface further comprises a cold treatment option, and the cold treatment option corresponds to the first laminating rotational speed of the first roller set.

In another preferred embodiment, the first roller set comprises two first rollers and a first gear wheel.

In another preferred embodiment, the laminator further comprises a second roller set capable of clipping and delivering the two films and the object coming from the first roller set, wherein the second roller set comprises two second rollers and a second gear wheel.

In another preferred embodiment, the first driving device comprises a driving gear wheel.

In another preferred embodiment, the second driving device connects with the speed changing gear set.

In another preferred embodiment, the transmission gear set comprises a first transmission gear wheel, a second transmission gear wheel, a third transmission gear wheel and a first shaft, wherein a diameter of the second transmission gear wheel is larger than a diameter of the first transmission gear wheel, a diameter of the third transmission gear wheel is larger than a diameter of the second transmission gear wheel, all of the first transmission gear wheel, the second transmission gear wheel and the third transmission gear wheel pass through the first shaft, and the second transmission gear wheel engages with the first gear wheel and the second gear wheel.

In another preferred embodiment, the speed changing gear set comprises a first speed changing gear wheel, a second speed changing gear wheel, a third speed changing gear wheel and a second shaft, wherein a diameter of the first speed changing gear wheel is larger than a diameter of the second speed changing gear wheel, a diameter of the second speed changing gear wheel is larger than a diameter of the third speed changing gear wheel, all of the first speed changing gear wheel, the second speed changing gear wheel and the third speed changing gear wheel pass through the second shaft, and the first speed changing gear wheel engages with the driving gear wheel of the first driving device.

In another preferred embodiment, when the second driving device moves the speed changing gear set to a first speed changing position, the first speed changing gear wheel engages with the first transmission gear wheel, and the first roller set and the second roller set rotate with a first laminating rotational speed. In addition, when the second driving device moves the speed changing gear set to a second speed changing position, the second speed changing gear wheel engages with the second transmission gear wheel, and the first roller set and the second roller set rotate with a second laminating rotational speed. In contrary, when the second driving device moves the speed changing gear set to a third speed changing position, the third speed changing gear wheel engages with the third transmission gear wheel, and the first roller set and the second roller set rotate with a third laminating rotational speed.

In another preferred embodiment, a side edge of each of teeth of the first transmission gear wheel, the second transmission gear wheel, the third transmission gear wheel, the first speed changing gear wheel, the second speed changing gear wheel and the third speed changing gear wheel further comprises two chamfers, so as to smoothly engage the first speed changing gear wheel, the second speed changing gear wheel and the third speed changing gear wheel with the first transmission gear wheel, the second transmission gear wheel and the third transmission gear wheel.

DETAILED DESCRIPTION OF THE PREFERRED EMBODIMENT

Each of a first specific embodiment and a second specific embodiment according to the present invention provides a laminator with changeable rotation speed and heating temperature, which is capable of laminating two films with different thickness and an object disposed there between.

Figure 1A:
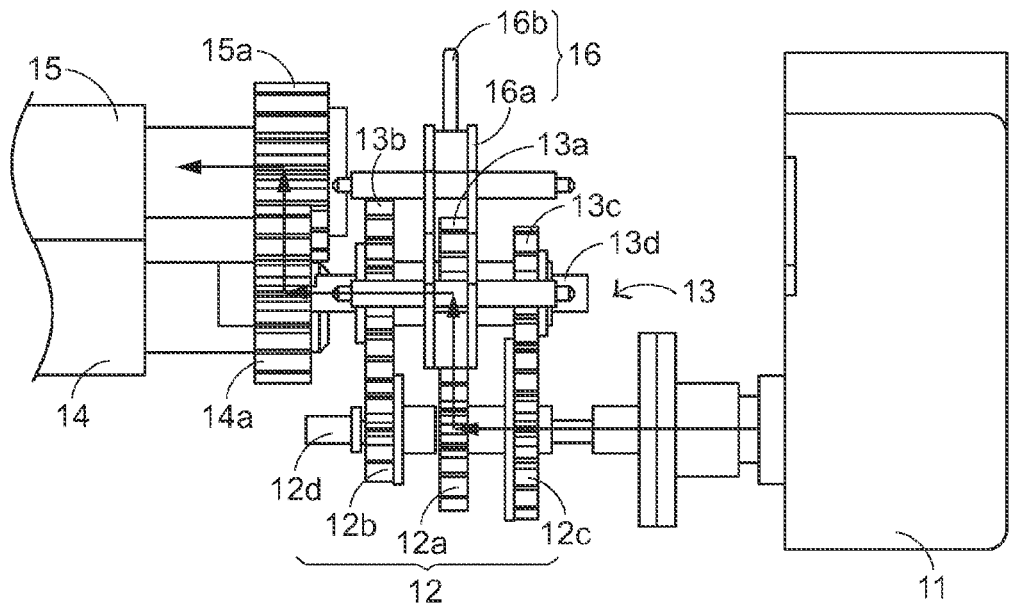
FIG. 1A illustrates a side view of a conventional laminator with changeable rotation speed at a first rotational speed status.
Figure 1B:
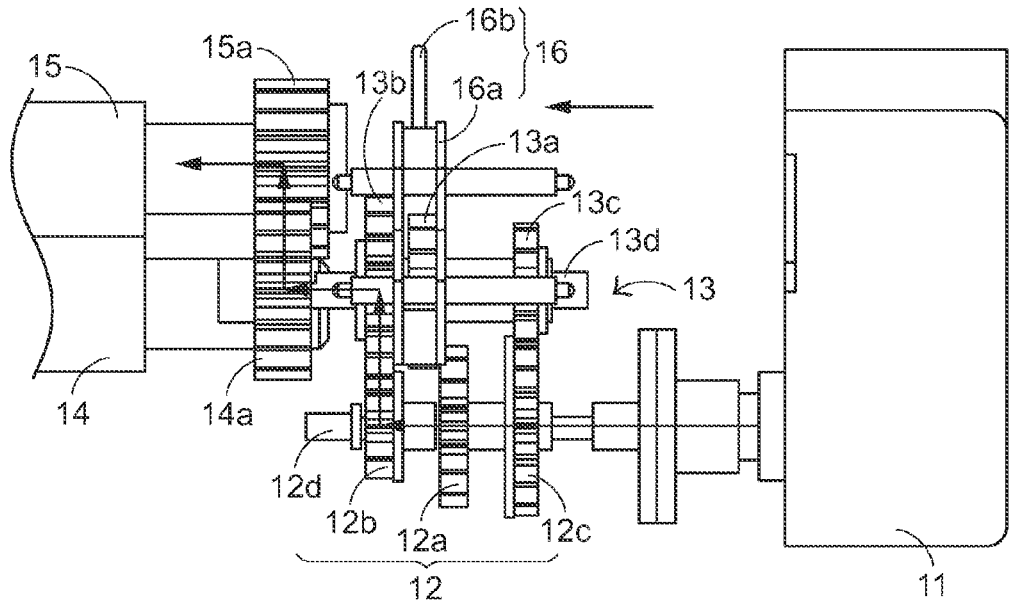
FIG. 1B illustrates a side view of a conventional laminator with changeable rotation speed at a second rotational speed status.
Figure 1C:
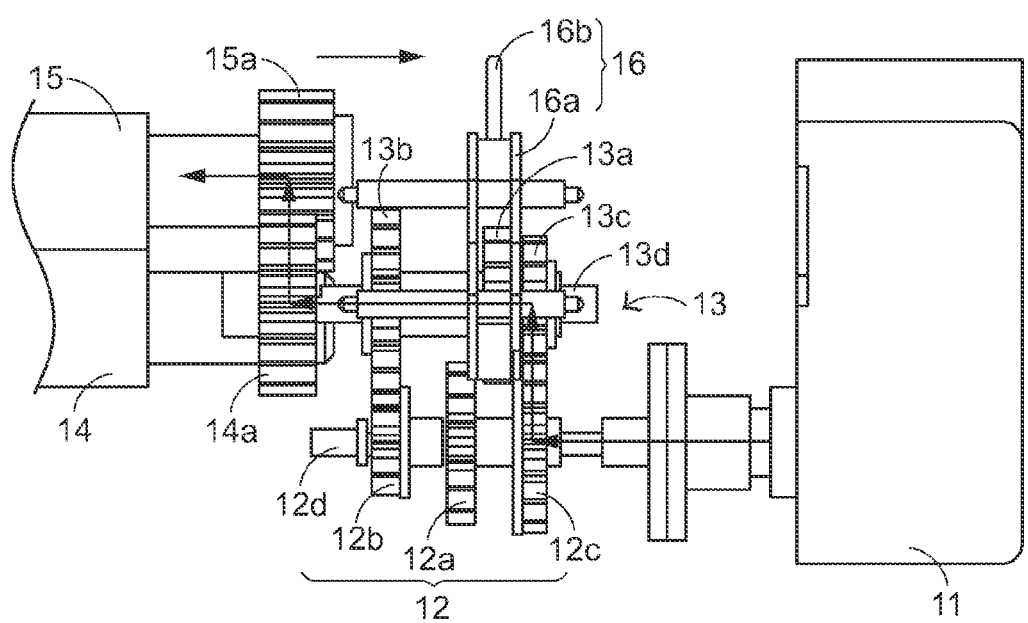
FIG. 1C illustrates a side view of a conventional laminator with changeable rotation speed at a third rotational speed status.
Figure 2:
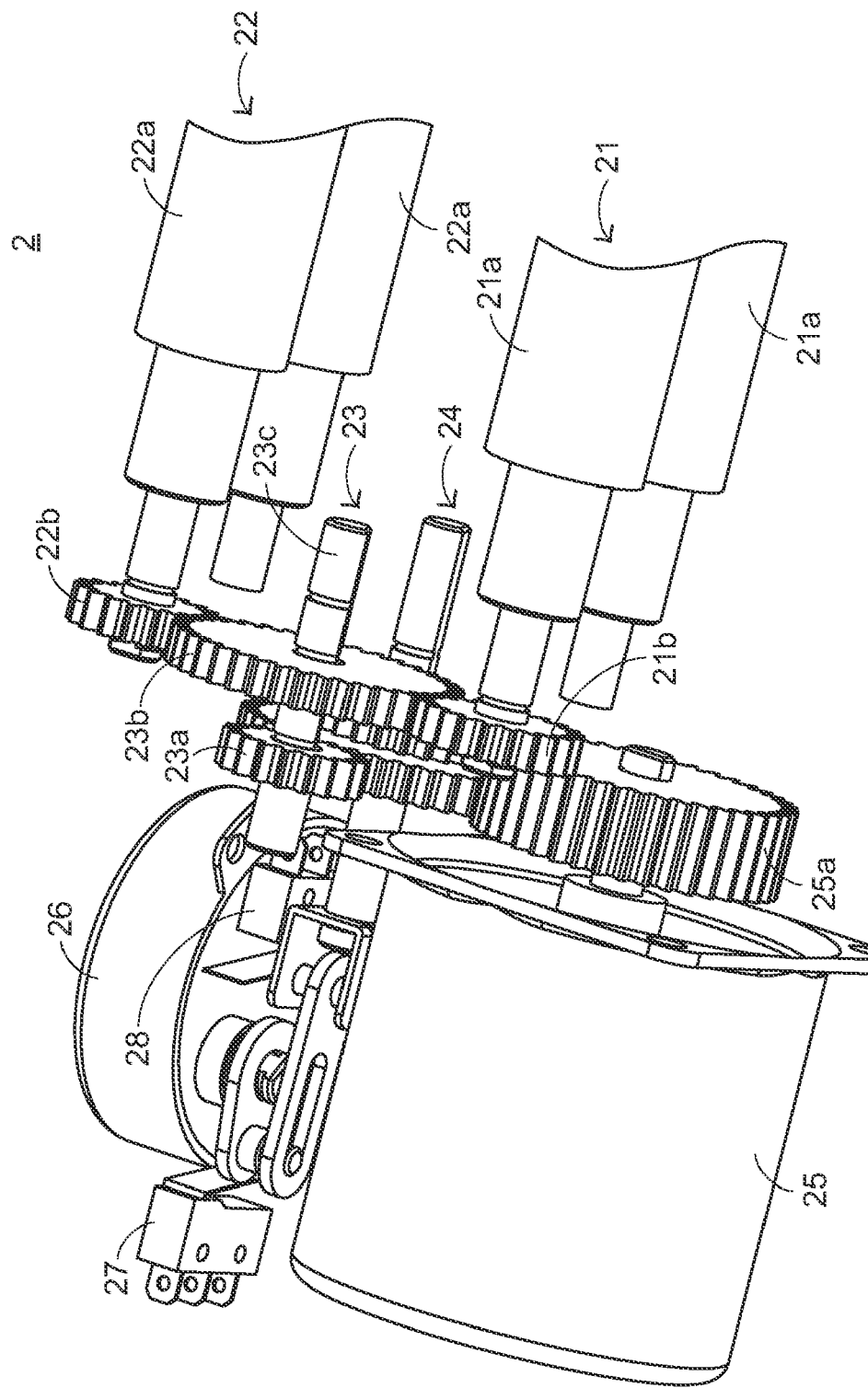
FIG. 2 illustrates a perspective view of a laminator according to a first embodiment of the present invention.
Figure 3:
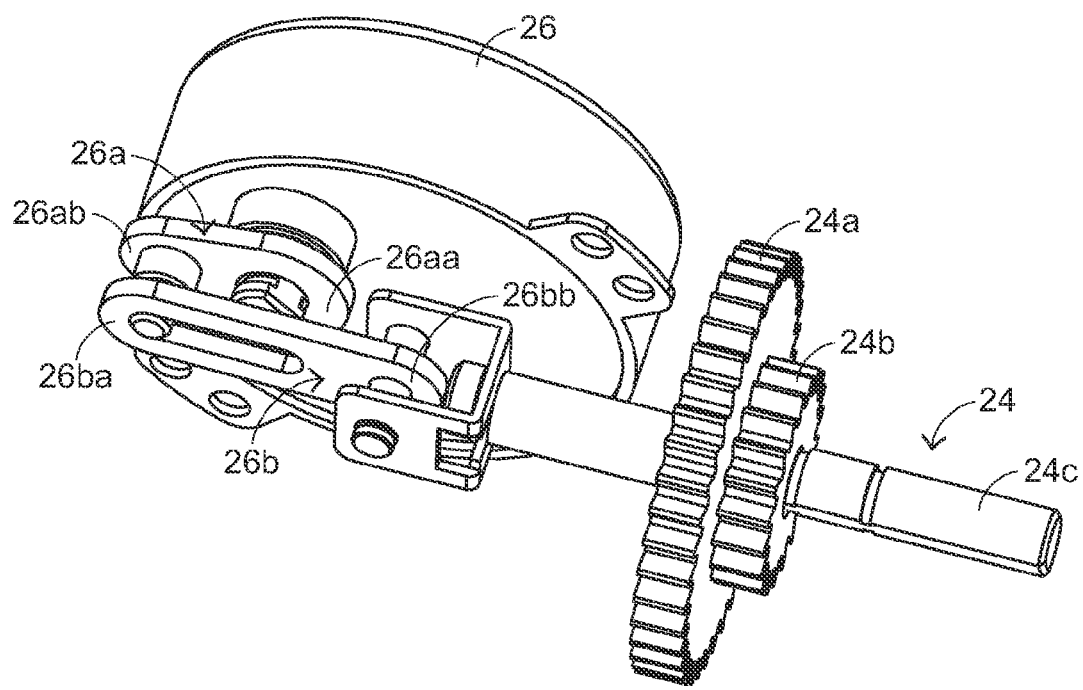
FIG. 3 illustrates a perspective view of the speed changing gear set and the second driving device of the laminator according to a first embodiment of the present invention.
Figure 4:
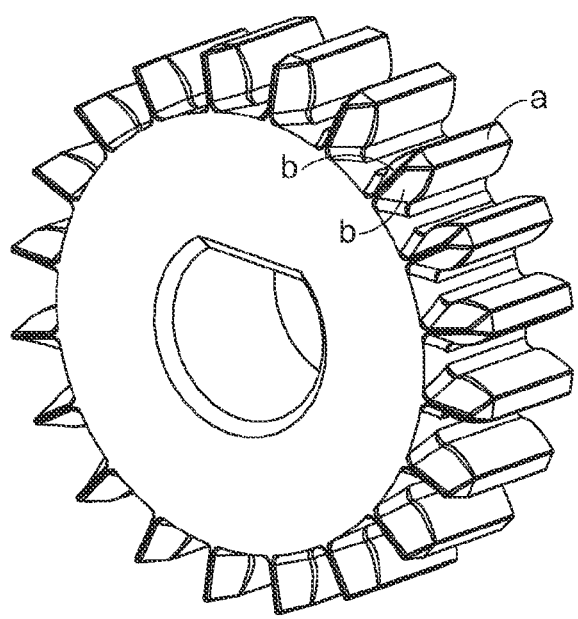
FIG. 4 illustrates a schematic view of the gear wheel of the laminator according to a first embodiment of the present invention, wherein each of the teeth of the gear wheel has two chamfers.
Figure 5:
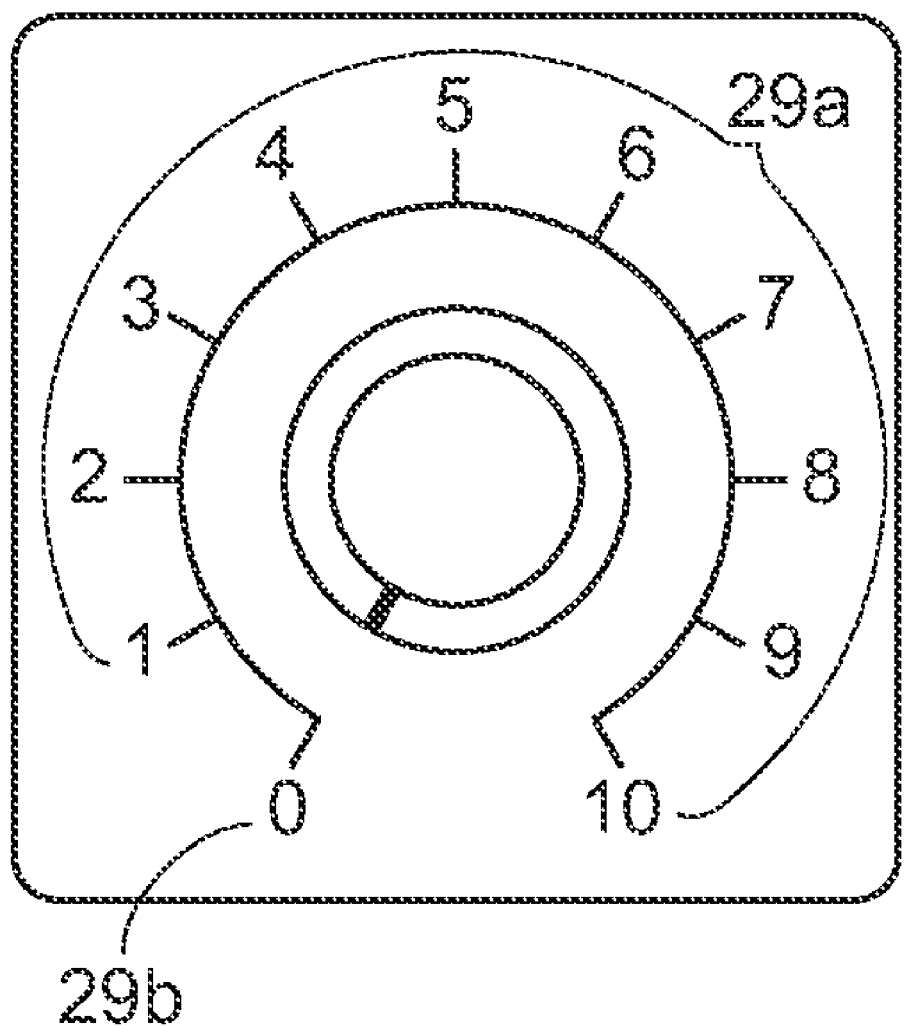
FIG. 5 illustrates a schematic view of the input interface of the laminator according to a first embodiment of the present invention.
Figure 6:
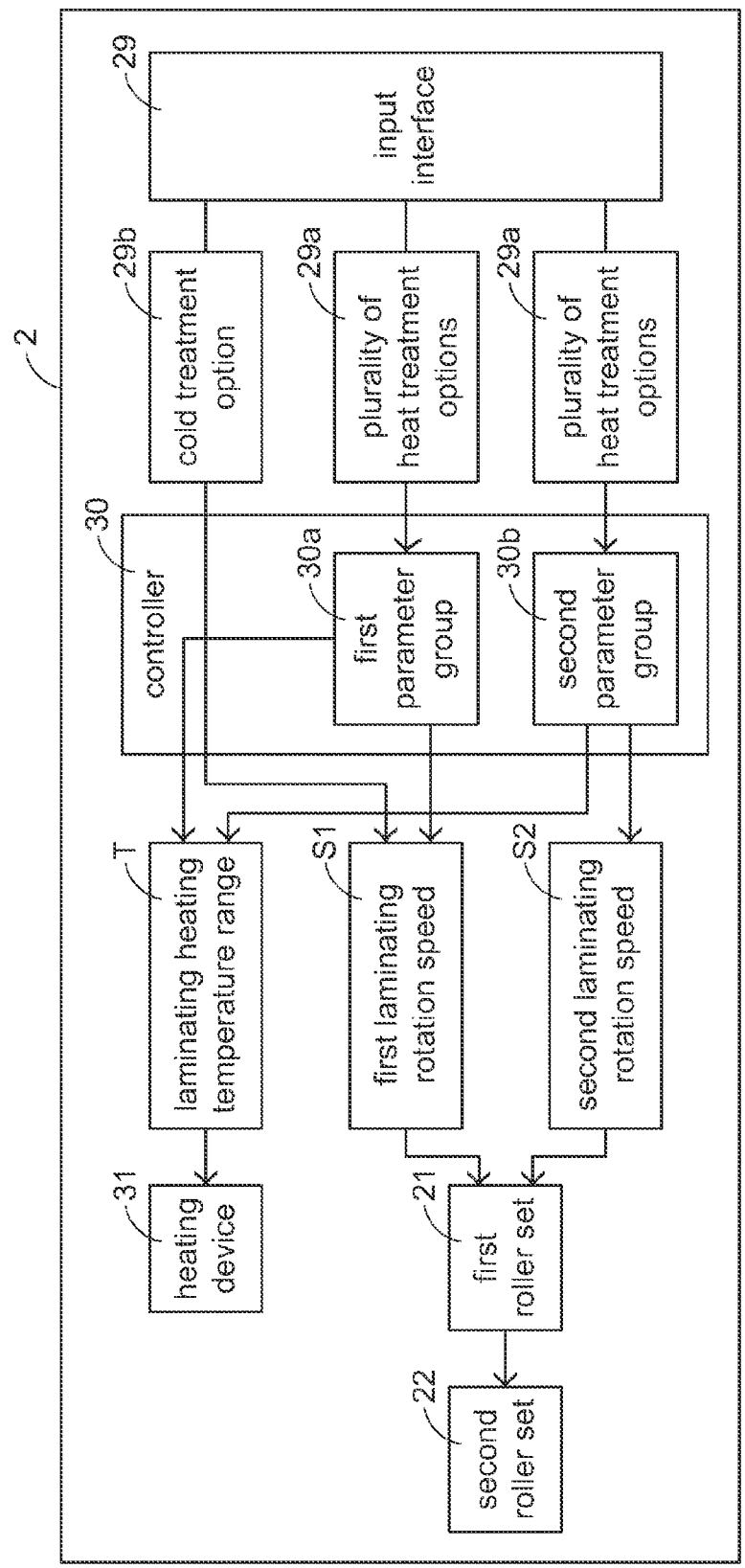
FIG. 6 illustrates a block diagram of the laminator according to a first embodiment of the present invention.

Referring to FIG. 2 to FIG. 6 together, wherein FIG. 2 illustrates a perspective view of a laminator according to a first embodiment of the present invention, FIG. 3 illustrates a perspective view of the speed changing gear set and the second driving device of the laminator according to a first embodiment of the present invention, FIG. 4 illustrates a schematic view of the gear wheel of the laminator according to a first embodiment of the present invention, wherein each of the teeth of the gear wheel has two chamfers, FIG. 5 illustrates a schematic view of the input interface of the laminator according to a first embodiment of the present invention, and FIG. 6 illustrates a block diagram of the laminator according to a first embodiment of the present invention.

As illustrated in FIG. 2 and FIG. 3, the laminator 2 comprises a first roller set 21, a second roller set 22, a transmission gear set 23, a speed changing gear set 24, a first driving device 25, a second driving device 26, a first sensor 27, a second sensor 28, an input interface 29, a controller 30 and a heating device 31.

Herein, the first roller set 21 comprises two first rollers 21a and a first gear wheel 21b, while the second roller set 22 comprises two second rollers 22a and a second gear wheel 22b. The transmission gear set 23 comprises a first transmission gear wheel 23a, a second transmission gear wheel 23b and a first shaft 23c, wherein a diameter of the second transmission gear wheel 23b is larger than a diameter of the first transmission gear wheel 23a. The speed changing gear set 24 comprises a first speed changing gear wheel 24a, a second speed changing gear wheel 24b and a second shaft 24c, wherein a diameter of the first speed changing gear wheel 24a is larger than a diameter of the second speed changing gear wheel 24b. The first driving device 25 comprises a driving gear wheel 25a, while the second driving device 26 comprises a first connecting component 26a and a second connecting component 26b. Besides, as illustrated in FIG. 4, a side edge of each of teeth a of the first transmission gear wheel 23a, the second transmission gear wheel 23b, the first speed changing gear wheel 24a and the second speed changing gear wheel 24b further comprises two chamfers b.

As illustrated in FIG. 5, the input interface 29 is located on an outer surface of a case of the laminator 2 and comprises a plurality of heat treatment options 29a and a cold treatment option 29b. In the present embodiment, the cold treatment option 29b is marked as a scale 0, the plurality of the heat treatment options 29a are marked as scales 1 to 10, wherein each of the heat treatment options 29a corresponds to a film thickness, and the larger one of the numbers of the heat treatment options 29a corresponds to a larger one of the film thicknesses.

Referring to FIG. 5 and FIG. 6 together herein after. In the present embodiment, the controller 30 comprises a first parameter group 30a and a second parameter group 30b, wherein the first parameter group 30a corresponds to the plurality of heat treatment options 29a marked as scales 1 to 5, while the second parameter group 30b corresponds to the plurality of heat treatment options 29a marked as scales 6 to 10. Herein, the plurality of heat treatment options 29a marked as scales 1 to 5 and corresponded to the first parameter group 30a correspond to a first laminating rotation speed S1 of the first roller set 21 and the second roller set 22, while the plurality of heat treatment options 29a marked as scales 6 to 10 and corresponded to the second parameter group 30b correspond to a second laminating rotation speed S2 of the first roller set 21 and the second roller set 22. Since an average of the film thicknesses corresponded to the plurality of heat treatment options 29a of the first parameter group 30a is smaller than that of the second parameter group 30b, the first laminating rotation speed S1 is larger than the second laminating rotation speed S2.

In addition, the plurality of heat treatment options 29a marked as the scales 1 to 5 and corresponded to the first parameter group 30a respectively correspond to a laminating heating temperature within a laminating heating temperature range T. In the present embodiment, the laminating heating temperature range T is ranged between 110 degrees and 150 degrees, wherein the laminating heating temperature corresponding to the heat treatment option 29a marked as the scale 1 is 110 degrees, the laminating heating temperature corresponding to the heat treatment option 29a marked as the scale 2 is 120 degrees, the laminating heating temperature corresponding to the heat treatment option 29a marked as the scale 3 is 130 degrees, the laminating heating temperature corresponding to the heat treatment option 29a marked as the scale 4 is 140 degrees, and the laminating heating temperature corresponding to the heat treatment option 29a marked as the scale 5 is 150 degrees.

Furthermore, the plurality of heat treatment options 29a marked as the scales 6 to 10 and corresponded to the second parameter group 30b further respectively correspond to a laminating heating temperature within the same laminating heating temperature range T, wherein the laminating heating temperature corresponding to the heat treatment option 29a marked as the scale 6 is 110 degrees, the laminating heating temperature corresponding to the heat treatment option 29a marked as the scale 7 is 120 degrees, the laminating heating temperature corresponding to the heat treatment option 29a marked as the scale 8 is 130 degrees, the laminating heating temperature corresponding to the heat treatment option 29a marked as the scale 9 is 140 degrees, and the laminating heating temperature corresponding to the heat treatment option 29a marked as the scale 10 is 150 degrees.

An assembly sequence of the laminator according to the first embodiment of the present invention is illustrated herein after. Referring to FIG. 2 and FIG. 3 again, the driving gear wheel 25a passes through the first driving device 25. The first speed changing gear wheel 24a and the second speed changing gear wheel 24b of the speed changing gear set 24 pass through the second shaft 24c, and the first speed changing gear wheel 24a engages with the driving gear wheel 25a of the first driving device 25. A first end 26aa of the first connecting component 26a of the second driving device 26 is pivoted to the second driving device 26, a second end 26ab of the first connecting component 26a passes though a first end 26ba of the second connecting component 26b, and a second end 26bb of the second connecting component 26b connects with the second shaft 24c. The first sensor 27 and the second sensor 28 are respectively disposed at two sides of the first connecting component 26a. The transmission gear set 23 is located over the speed changing gear set 24, and the first transmission gear wheel 23a and the second transmission gear wheel 23b respectively pass through two ends of the first shaft 23c. The two first rollers 21a of the first roller set 21 lean against to each other, the first gear wheel 21b passes through one end of one of the first rollers 21a, and the first gear wheel 21b engages with a side of the second transmission gear wheel 23b. The second roller set 22 is located at a downstream of the first roller set 21, the two second rollers 22a lean against to each other, the second gear wheel 22b passes through one end of one of the second rollers 22a, and the second gear wheel 22b engages with another side of the second transmission gear wheel 23b.

Figure 7:
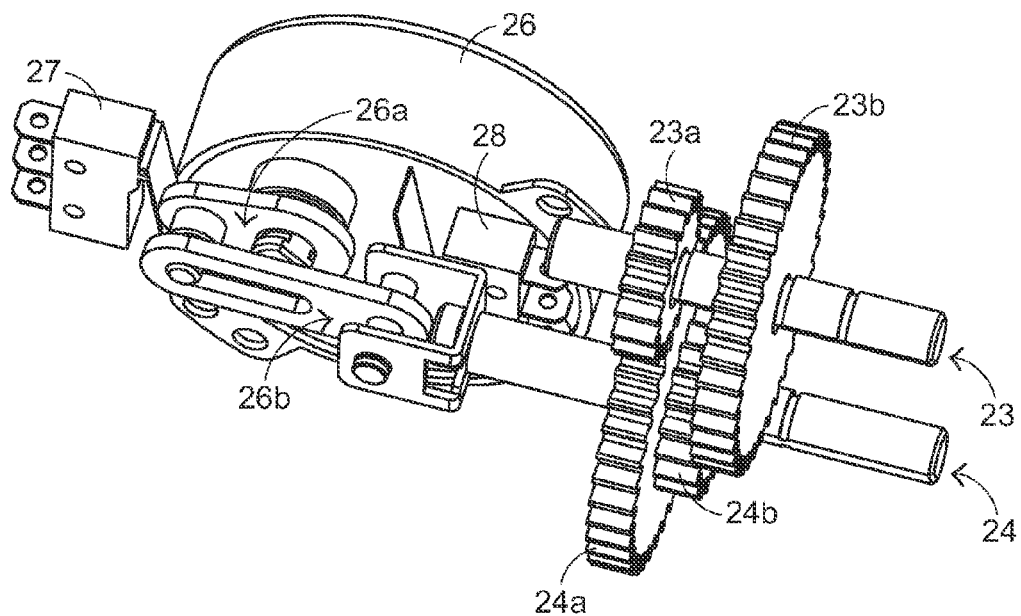
FIG. 7 illustrates a perspective view of the speed changing gear set of the laminator at a first speed changing position according to a first embodiment of the present invention.
Figure 8:
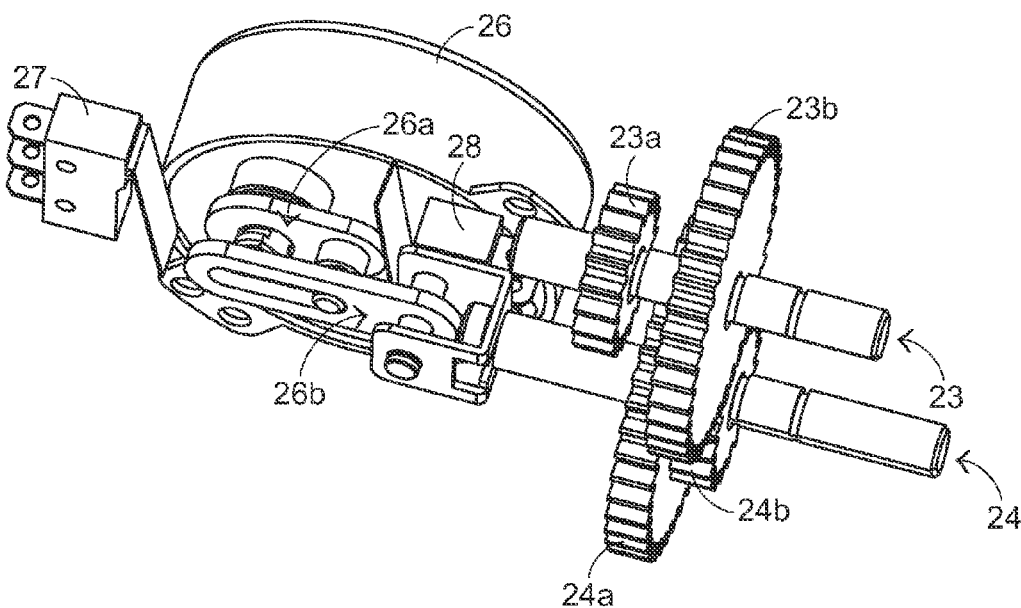
FIG. 8 illustrates a perspective view of the speed changing gear set of the laminator at a second speed changing position according to a first embodiment of the present invention.

A connection between the transmission gear set 23 and the speed changing gear set 24 is illustrated herein after. Referring to FIG. 7 and FIG. 8 together, wherein FIG. 7 illustrates a perspective view of the speed changing gear set of the laminator at a first speed changing position according to a first embodiment of the present invention, while FIG. 8 illustrates a perspective view of the speed changing gear set of the laminator at a second speed changing position according to a first embodiment of the present invention. When the speed changing gear set 24 is located at the first speed changing position (as illustrated in FIG. 7), the first speed changing gear wheel 24a engages with the first transmission gear wheel 23a, and the first roller set 21 and the second roller set 22 rotate with the first laminating rotation speed S1. When the speed changing gear set 24 is located at the second speed changing position (as illustrated in FIG. 8), the second speed changing gear wheel 24b engages with the second transmission gear wheel 23b, and the first roller set 21 and the second roller set 22 rotate with the second laminating rotation speed S2. Besides, the speed changing gear set 24 is capable of switching between the first speed changing position and the second speed changing position more smoothly due to two chambers b of each of the teeth a of the first transmission gear wheel 23a, the second transmission gear wheel 23b, the first speed changing gear wheel 24a and the second speed changing gear wheel 24b. It should be noted that since a diameter of the first speed changing gear wheel 24a is larger than a diameter of the second speed changing gear wheel 24b, and a diameter of the first transmission gear wheel 23a is smaller than a diameter of the second transmission gear wheel 23b, the first laminating rotational speed S1 is larger than the second laminating rotational speed S2.

Figure 9:
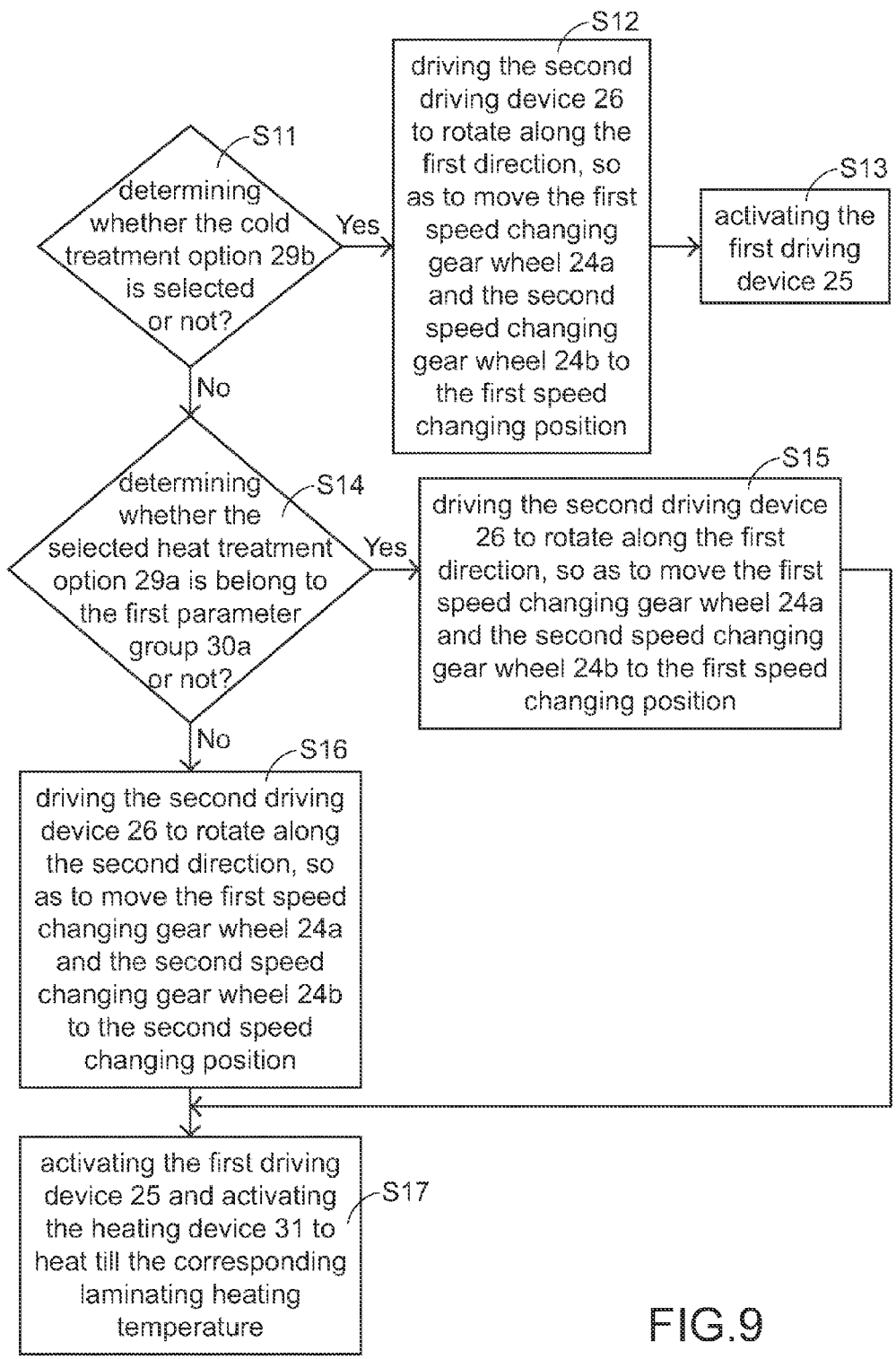
FIG. 9 illustrates a flow chart of the controller of the laminator according to a first embodiment of the present invention.

An operation process of the first embodiment of the present invention is illustrated herein after. Referring to FIG. 5 to FIG. 9 together, wherein FIG. 9 illustrates a flow chart of the controller of the laminator according to a first embodiment of the present invention. A user can select one of the heat treatment options 29a or the cold treatment option 29b by using the input interface 29 according to his requirement before he delivers two films and an object disposed between the two films inside the laminator 2. If the user selects the cold treatment option 29b, it represents that adhesive films are used by the user. Therefore, it is unnecessary to heat the first roller set 21 and the second roller set 22, but only needed to deliver the two films and the object disposed between the two films passing through the first roller set 21 and the second roller set 22, so as to attach the two films together and thus seal the object between the two films. In contrast, if the user selects one of the heat treatment options 29a, it represents that adhesiveless films are used by the user. Therefore, it is necessary to heat the first roller set 21 and the second roller set 22 for heating the two films, and then the two films are capable of being attached together.

After the selection described above, the controller 30 processes a step S11 first to determine whether the cold treatment option 29b is selected or not. If the cold treatment option 29b is selected, then the controller 30 determines that the first roller set 21 and the second roller set 22 need to be rotated with the first laminating rotational speed S1 without being heated. Hence, the controller 30 processes a step S12 to drive the second driving device 26 to rotate along a first direction. Therefore, the first connecting component 26a pulls the second connecting component 26b and then moves the second shaft 24c, so as to simultaneously move the first speed changing gear wheel 24a and the second speed changing gear wheel 24b till activating the first sensor 27 as illustrated in FIG. 7. At the moment, the speed changing gear set 24 is located at the first speed changing position. Next, the controller 30 stops to drive the second driving device 26 to rotate and then processes a step S13 to activate the first driving device 25. At the moment, the first roller set 21 and the second roller set 22 rotate with the first laminating rotational speed S1. After that, the user can deliver the two films and the object disposed between the two films inside the laminator 2 to pass through the first roller set 21 and the second roller set 22 in sequence, so as to seal the object between the two films.

If the controller 30 determines that the cold treatment option 29b is not selected at the step S11, then the controller 30 processes a step S14 to determine whether the selected heat treatment option 29a is belong to the first parameter group 30a or not. If the selected heat treatment option 29a is belong to the first parameter group 30a, for example the heat treatment option 29a marked as the scale 1 is selected, then the controller 30 determines that the first roller set 21 and the second roller set 22 need to be rotated with the first laminating rotational speed S1, and the heating device 31 needs to heat the first roller set 21 and the second roller set 22 till 110 degrees. Therefore, the controller 30 processes a step S15 to drive the second driving device 26 to rotate along the first direction, so as to move the first speed changing gear wheel 24a and the second speed changing gear wheel 24b to the first speed changing position as illustrated in FIG. 7. Next, the controller 30 stops to drive the second driving device 26 to rotate and then processes a step S17 to activate the first driving device 25 and activate the heating device 31 to heat till the corresponding laminating heating temperature. And thus, the first roller set 21 and the second roller set 22 rotate with the first laminating rotational speed S1 and are heated till 110 degrees. After that, the user can deliver the two films and the object disposed between the two films inside the laminator 2.

If the controller 30 determines that the selected heat treatment option 29a is not belong to the first parameter group 30a at the step S14, for example the heat treatment option 29a marked as the scale 7 is selected, then the controller 30 determines that the first roller set 21 and the second roller set 22 need to be rotated with the second laminating rotational speed S2, and the heating device 31 needs to heat the first roller set 21 and the second roller set 22 till 120 degrees. Hence, the controller 30 processes a step S16 to drive the second driving device 26 to rotate along a second direction. Therefore, the first connecting component 26a pulls the second connecting component 26b and then moves the second shaft 24c, so as to simultaneously move the first speed changing gear wheel 24a and the second speed changing gear wheel 24b till activating the second sensor 28 as illustrated in FIG. 8. At the moment, the speed changing gear set 24 is located at the second speed changing position. Next, the controller 30 stops to drive the second driving device 26 to rotate and then processes a step S17 to activate the first driving device 25 and activate the heating device 31 to heat till the corresponding laminating heating temperature. And thus, the first roller set 21 and the second roller set 22 rotate with the second laminating rotational speed S2 and are heated till 120 degrees. After that, the user can deliver the two films and the object disposed between the two films inside the laminator 2.

Figure 10:
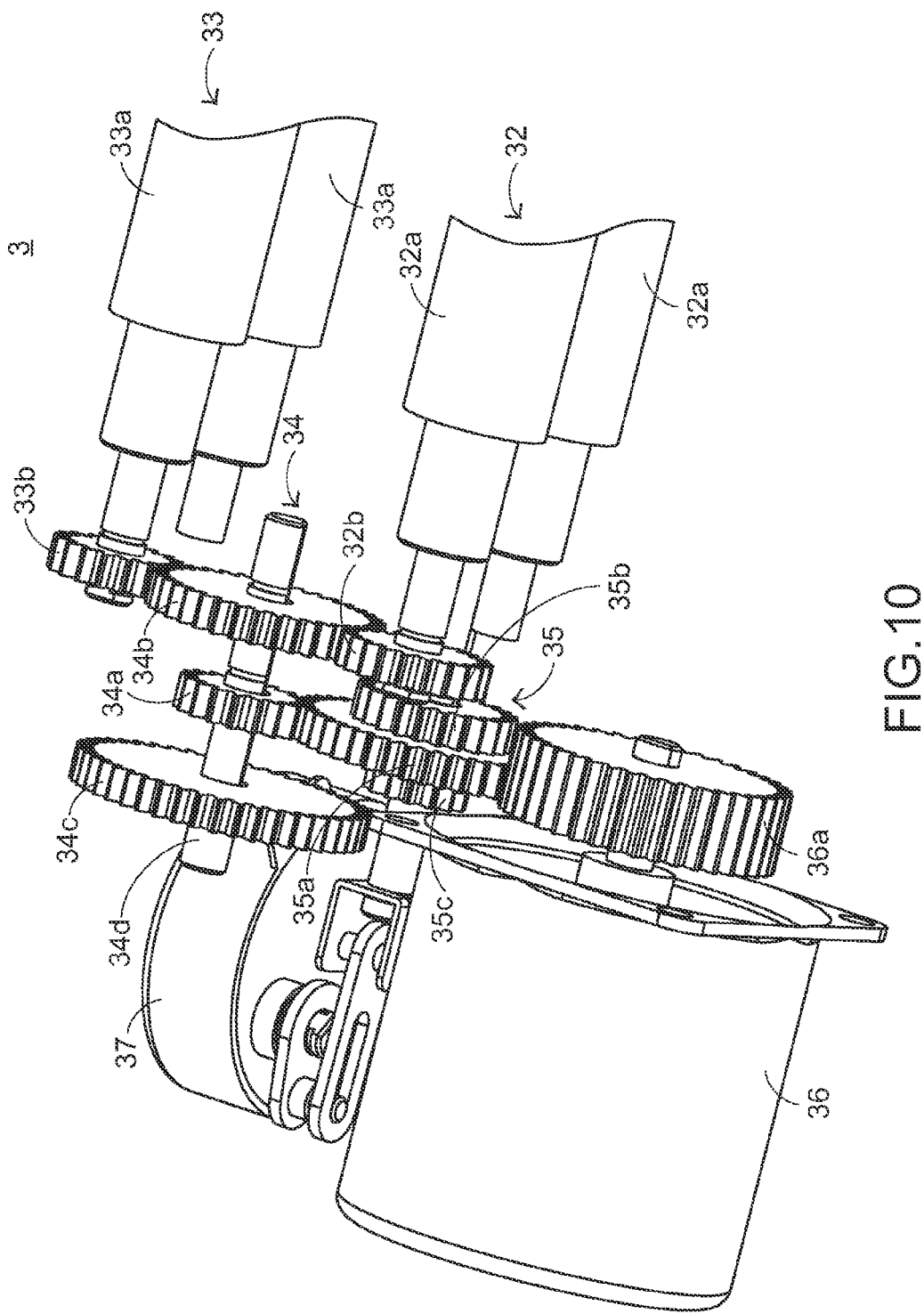
FIG. 10 illustrates a perspective view of a laminator according to a second embodiment of the present invention.
Figure 11:
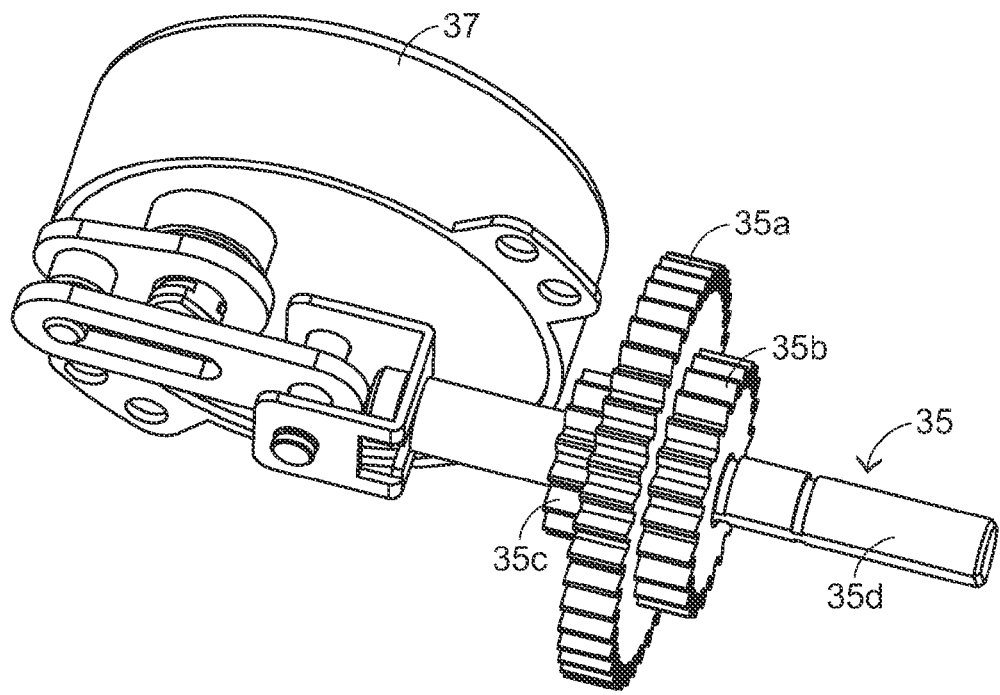
FIG. 11 illustrates a perspective view of the second driving device and the speed changing gear set of the laminator according to a second embodiment of the present invention.
Figure 12:
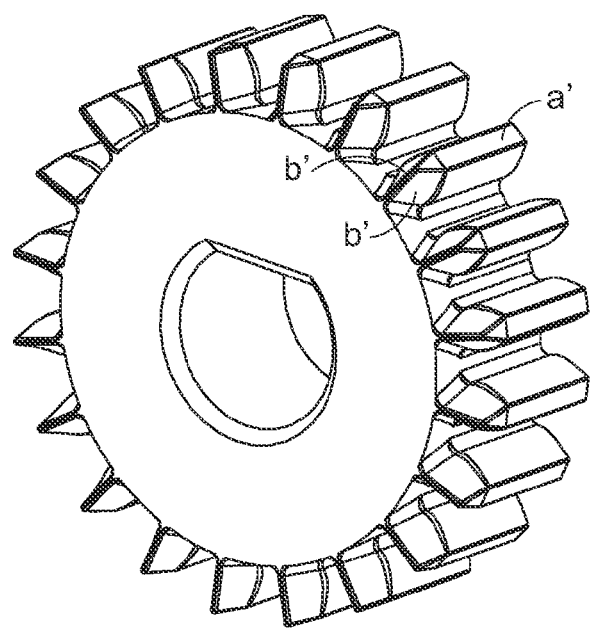
FIG. 12 illustrates a schematic view of the gear wheel of the laminator according to a second embodiment of the present invention, wherein each of the teeth of the gear wheel has two chamfers.
Figure 13:
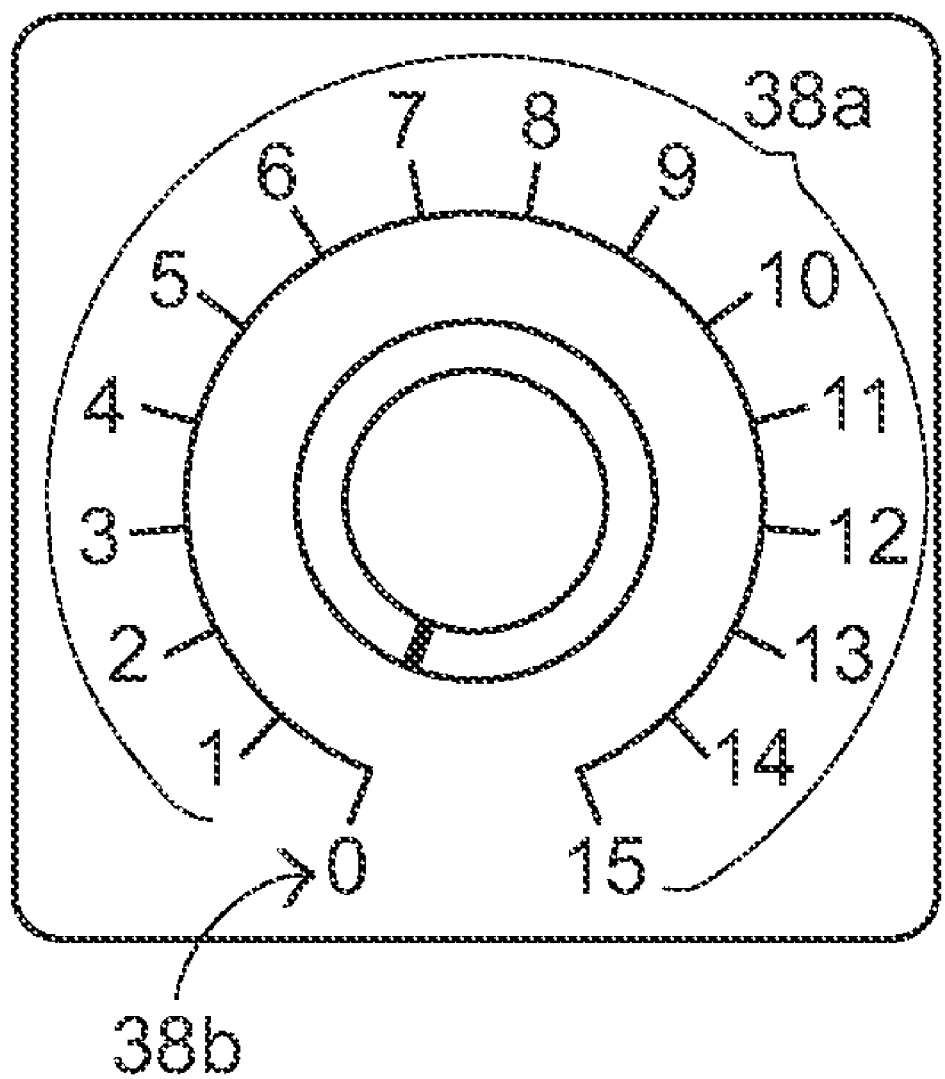
FIG. 13 illustrates a schematic view of the input interface of the laminator according to a second embodiment of the present invention.
Figure 14:
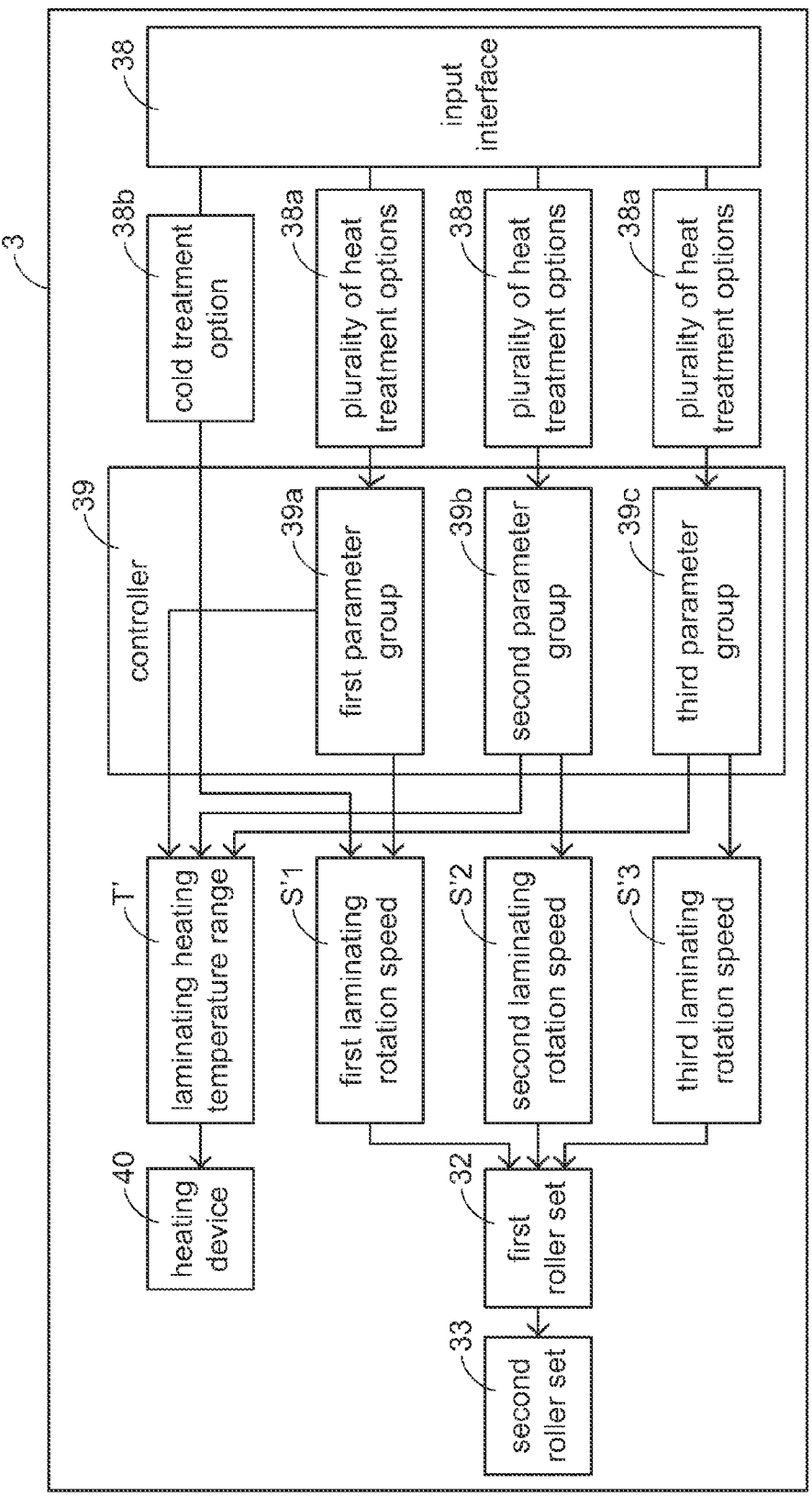
FIG. 14 illustrates a block diagram of the laminator according to a second embodiment of the present invention.

A laminator of a second specific embodiment of the present invention is illustrated herein after. Referring to FIG. 10 to FIG. 14 together, wherein FIG. 10 illustrates a perspective view of a laminator according to a second embodiment of the present invention, FIG. 11 illustrates a perspective view of the second driving device and the speed changing gear set of the laminator according to a second embodiment of the present invention, FIG. 12 illustrates a schematic view of the gear wheel of the laminator according to a second embodiment of the present invention, wherein each of the teeth of the gear wheel has two chamfers, FIG. 13 illustrates a schematic view of the input interface of the laminator according to a second embodiment of the present invention, and FIG. 14 illustrates a block diagram of the laminator according to a second embodiment of the present invention.

As illustrated in FIG. 10 and FIG. 11, the laminator 3 comprises a first roller set 32, a second roller set 33, a transmission gear set 34, a speed changing gear set 35, a first driving device 36, a second driving device 37, an input interface 38, a controller 39 and a heating device 40. In a word, what the laminator 3 of the second embodiment different from the laminator 2 of the first embodiment are the transmission gear set 34, the speed changing gear set 35, the input interface 38 and the controller 39.

In the present embodiment, the first roller set 32 comprises two first rollers 32a and a first gear wheel 32b, while the second roller set 33 comprises two second rollers 33a and a second gear wheel 33b. The transmission gear set 34 comprises a first transmission gear wheel 34a, a second transmission gear wheel 34b, a third transmission gear wheel 34c and a first shaft 34d, wherein a diameter of the second transmission gear wheel 34b is larger than a diameter of the first transmission gear wheel 34a, and a diameter of the third transmission gear wheel 34c is larger than the diameter of the second transmission gear wheel 34b. The speed changing gear set 35 comprises a first speed changing gear wheel 35a, a second speed changing gear wheel 35b, a third speed changing gear wheel 35c and a second shaft 35d, wherein a diameter of the first speed changing gear wheel 35a is larger than a diameter of the second speed changing gear wheel 35b, and the diameter of the second speed changing gear wheel 35b is larger than a diameter of the third speed changing gear wheel 35c. The first driving device 36 comprises a driving gear wheel 36a. In addition, a side edge of each of teeth a' of the first transmission gear wheel 34a, the second transmission gear wheel 34b, the third transmission gear wheel 34c, the first speed changing gear wheel 35a, the second speed changing gear wheel 35b and the third speed changing gear wheel 35c further comprises two chamfers b' as illustrated in FIG. 12.

As illustrated in FIG. 13, the input interface 38 is located on an outer surface of a case of the laminator 3 and comprises a plurality of heat treatment options 38a and a cold treatment option 38b. In the present embodiment, the cold treatment option 38b is marked as a scale 0, the plurality of the heat treatment options 38a are marked as scales 1 to 15, wherein each of the heat treatment options 38a corresponds to a film thickness, and the larger one of the numbers of the heat treatment options 38a corresponds to a larger one of the film thicknesses.

Referring to FIG. 13 and FIG. 14 together herein after. The controller 39 in the present embodiment comprises a first parameter group 39a, a second parameter group 39b and a third parameter group 39c, wherein the first parameter group 39a corresponds to the plurality of heat treatment options 38a marked as scales 1 to 5, the second parameter group 39b corresponds to the plurality of heat treatment options 38a marked as scales 6 to 10, while the third parameter group 39c corresponds to the plurality of heat treatment options 38a marked as scales 11 to 15. Herein, the plurality of heat treatment options 38a marked as scales 1 to 5 and corresponded to the first parameter group 39a correspond to a first laminating rotation speed S'1 of the first roller set 32 and the second roller set 33, the plurality of heat treatment options 38a marked as scales 6 to 10 and corresponded to the second parameter group 39b correspond to a second laminating rotation speed S'2 of the first roller set 32 and the second roller set 33, while the plurality of heat treatment options 38a marked as scales 11 to 15 and corresponded to the third parameter group 39c correspond to a third laminating rotation speed S'3 of the first roller set 32 and the second roller set 33. It should be noted that since an average of the film thicknesses corresponded to the plurality of heat treatment options 38a of the first parameter group 39a is smaller than that of the second parameter group 39b, and an average of the film thicknesses corresponded to the plurality of heat treatment options 38a of the second parameter group 39b is smaller than that of the third parameter group 39c, the first laminating rotation speed S'1 is larger than the second laminating rotation speed S'2, and the second laminating rotation speed S'2 is larger than the third laminating rotation speed S'3.

In addition, the plurality of heat treatment options 38a marked as the scales 1 to 5 and corresponded to the first parameter group 39a respectively correspond to a laminating heating temperature within a laminating heating temperature range T'. In the present embodiment, the laminating heating temperature range T' is ranged between 110 degrees and 150 degrees, wherein the laminating heating temperature corresponding to the heat treatment option 38a marked as the scale 1 is 110 degrees, the laminating heating temperature corresponding to the heat treatment option 38a marked as the scale 2 is 120 degrees, the laminating heating temperature corresponding to the heat treatment option 38a marked as the scale 3 is 130 degrees, the laminating heating temperature corresponding to the heat treatment option 38a marked as the scale 4 is 140 degrees, and the laminating heating temperature corresponding to the heat treatment option 38a marked as the scale 5 is 150 degrees.

Furthermore, the plurality of heat treatment options 38a marked as the scales 6 to 10 and corresponded to the second parameter group 39b further respectively correspond to a laminating heating temperature within the same laminating heating temperature range T', wherein the laminating heating temperature corresponding to the heat treatment option 38a marked as the scale 6 is 110 degrees, the laminating heating temperature corresponding to the heat treatment option 38a marked as the scale 7 is 120 degrees, the laminating heating temperature corresponding to the heat treatment option 38a marked as the scale 8 is 130 degrees, the laminating heating temperature corresponding to the heat treatment option 38a marked as the scale 9 is 140 degrees, and the laminating heating temperature corresponding to the heat treatment option 38a marked as the scale 10 is 150 degrees.

Besides, the plurality of heat treatment options 38a marked as the scales 11 to 15 and corresponded to the third parameter group 39c respectively correspond to a laminating heating temperature within the same laminating heating temperature range T' as well, wherein the laminating heating temperature corresponding to the heat treatment option 38a marked as the scale 11 is 110 degrees, the laminating heating temperature corresponding to the heat treatment option 38a marked as the scale 12 is 120 degrees, the laminating heating temperature corresponding to the heat treatment option 38a marked as the scale 13 is 130 degrees, the laminating heating temperature corresponding to the heat treatment option 38a marked as the scale 14 is 140 degrees, and the laminating heating temperature corresponding to the heat treatment option 38a marked as the scale 15 is 150 degrees.

Figure 15:
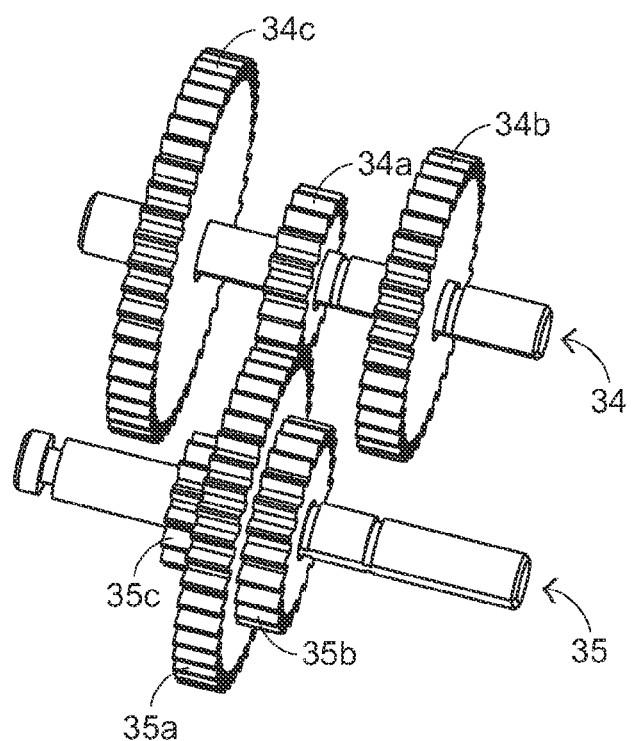
FIG. 15 illustrates a perspective view of the speed changing gear set of the laminator at a first speed changing position according to a second embodiment of the present invention.
Figure 16:
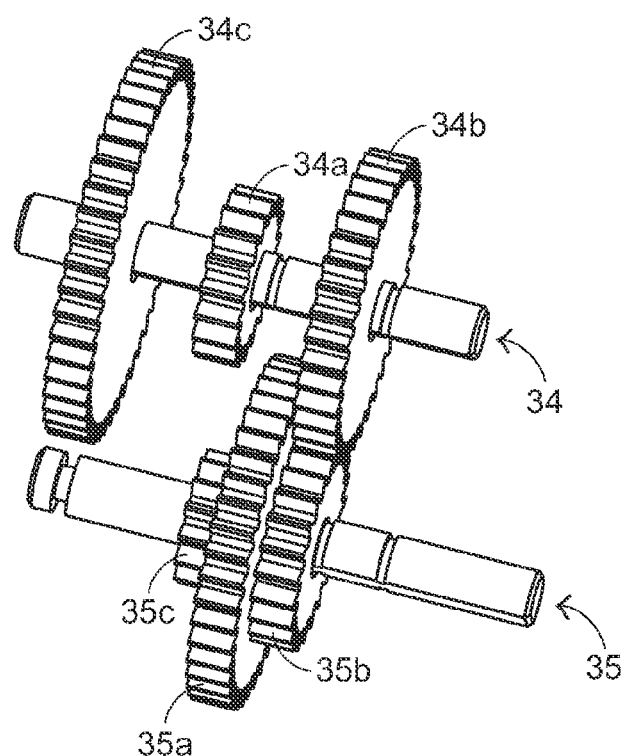
FIG. 16 illustrates a perspective view of the speed changing gear set of the laminator at a second speed changing position according to a second embodiment of the present invention.
Figure 17:
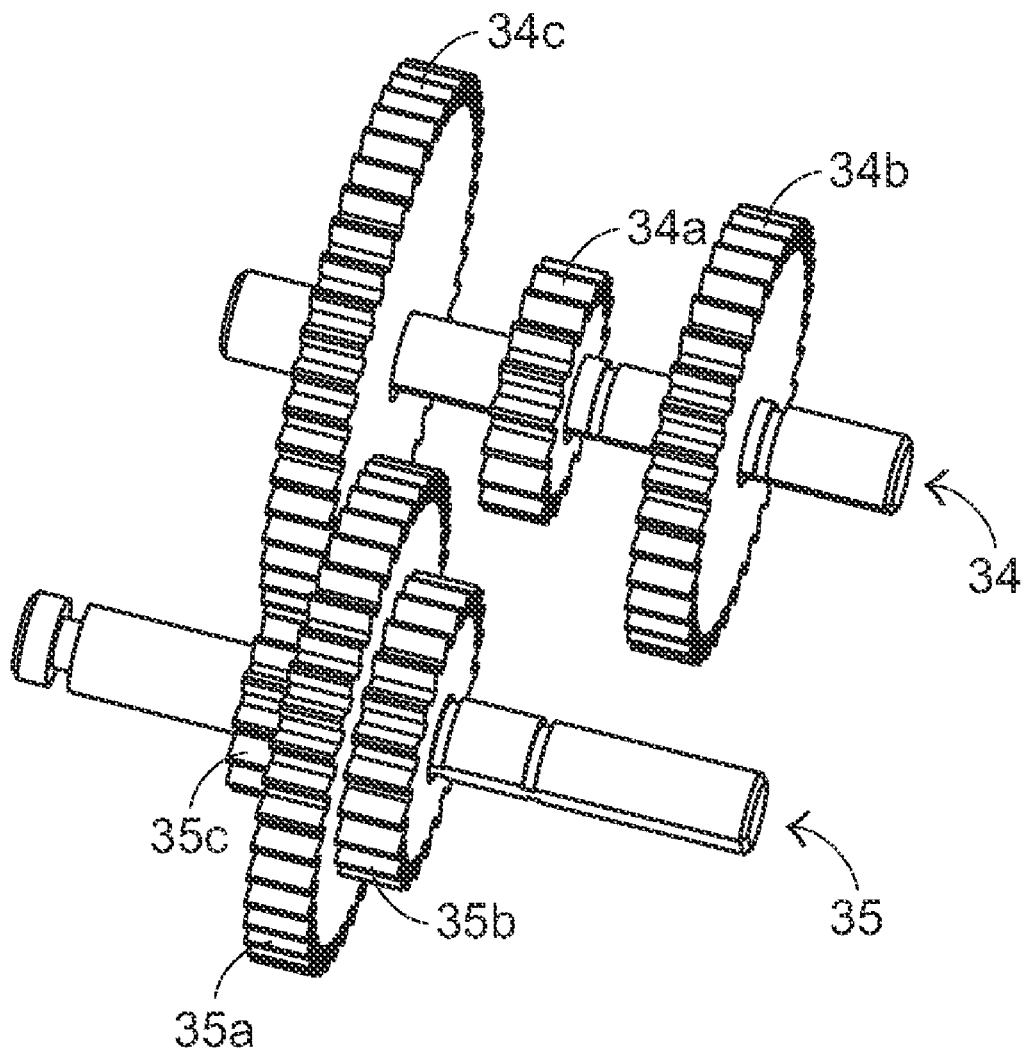
FIG. 17 illustrates a perspective view of the speed changing gear set of the laminator at a third speed changing position according to a second embodiment of the present invention.

The assembly sequence of the laminator of the second embodiment of the present invention is the same as that of the first embodiment and omitted herein. A connection between the transmission gear set 34 and the speed changing gear set 35 is illustrated herein after. Referring to FIG. 15 to FIG. 17 together, wherein FIG. 15 illustrates a perspective view of the speed changing gear set of the laminator at a first speed changing position according to a second embodiment of the present invention, FIG. 16 illustrates a perspective view of the speed changing gear set of the laminator at a second speed changing position according to a second embodiment of the present invention, and FIG. 17 illustrates a perspective view of the speed changing gear set of the laminator at a third speed changing position according to a second embodiment of the present invention. When the speed changing gear set 35 is located at the first speed changing position (as illustrated in FIG. 15), the first speed changing gear wheel 35a engages with the first transmission gear wheel 34a, and the first roller set 32 and the second roller set 33 rotate with the first laminating rotation speed S'1. When the speed changing gear set 35 is located at the second speed changing position (as illustrated in FIG. 16), the second speed changing gear wheel 35b engages with the second transmission gear wheel 34b, and the first roller set 32 and the second roller set 33 rotate with the second laminating rotation speed S'2. When the speed changing gear set 35 is located at the third speed changing position (as illustrated in FIG. 17), the third speed changing gear wheel 35c engages with the third transmission gear wheel 34c, and the first roller set 32 and the second roller set 33 rotate with the third laminating rotation speed S'3. Besides, the speed changing gear set 35 is capable of switching among the first speed changing position, the second speed changing position and the third speed changing position more smoothly due to two chambers b' of each of the teeth a' of the first transmission gear wheel 34a, the second transmission gear wheel 34b, the third transmission gear wheel 34c, the first speed changing gear wheel 35a, the second speed changing gear wheel 35b and the third speed changing gear wheel 35c. It should be noted that since a diameter of the first speed changing gear wheel 35a is larger than a diameter of the second speed changing gear wheel 35b, a diameter of the second speed changing gear wheel 35b is larger than a diameter of the third speed changing gear wheel 35c, a diameter of the third transmission gear wheel 34c is larger than a diameter of the second transmission gear wheel 34b, and a diameter of the second transmission gear wheel 34b is larger than a diameter of the first transmission gear wheel 34a, the first laminating rotational speed S'1 is larger than the second laminating rotational speed S'2, and the second laminating rotational speed S'2 is larger than the third laminating rotational speed S'3.

Figure 18A:
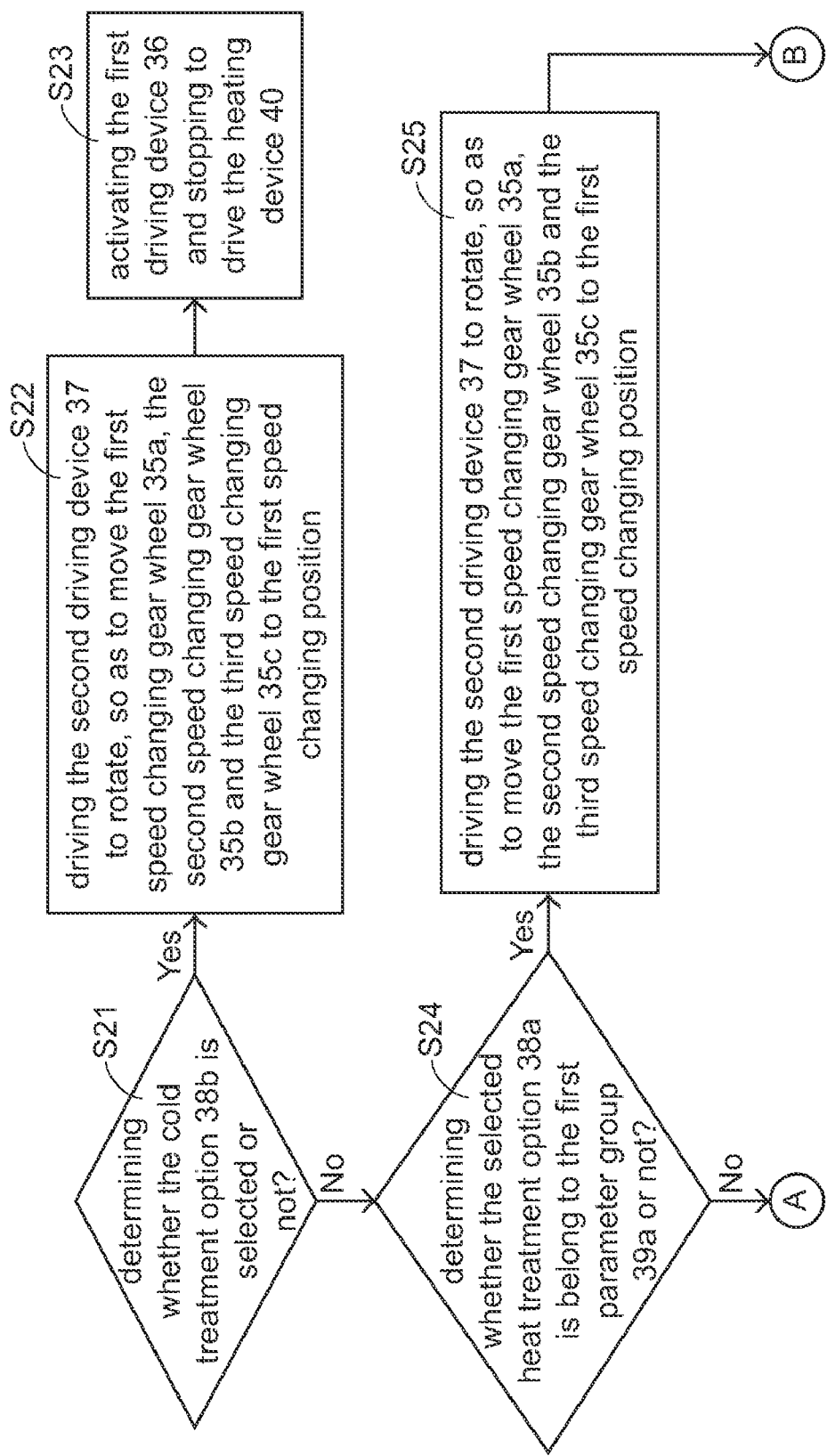
FIG. 18A and FIG. 18B illustrates a flow chart of the controller of the laminator according to a second embodiment of the present invention.
Figure 18B:
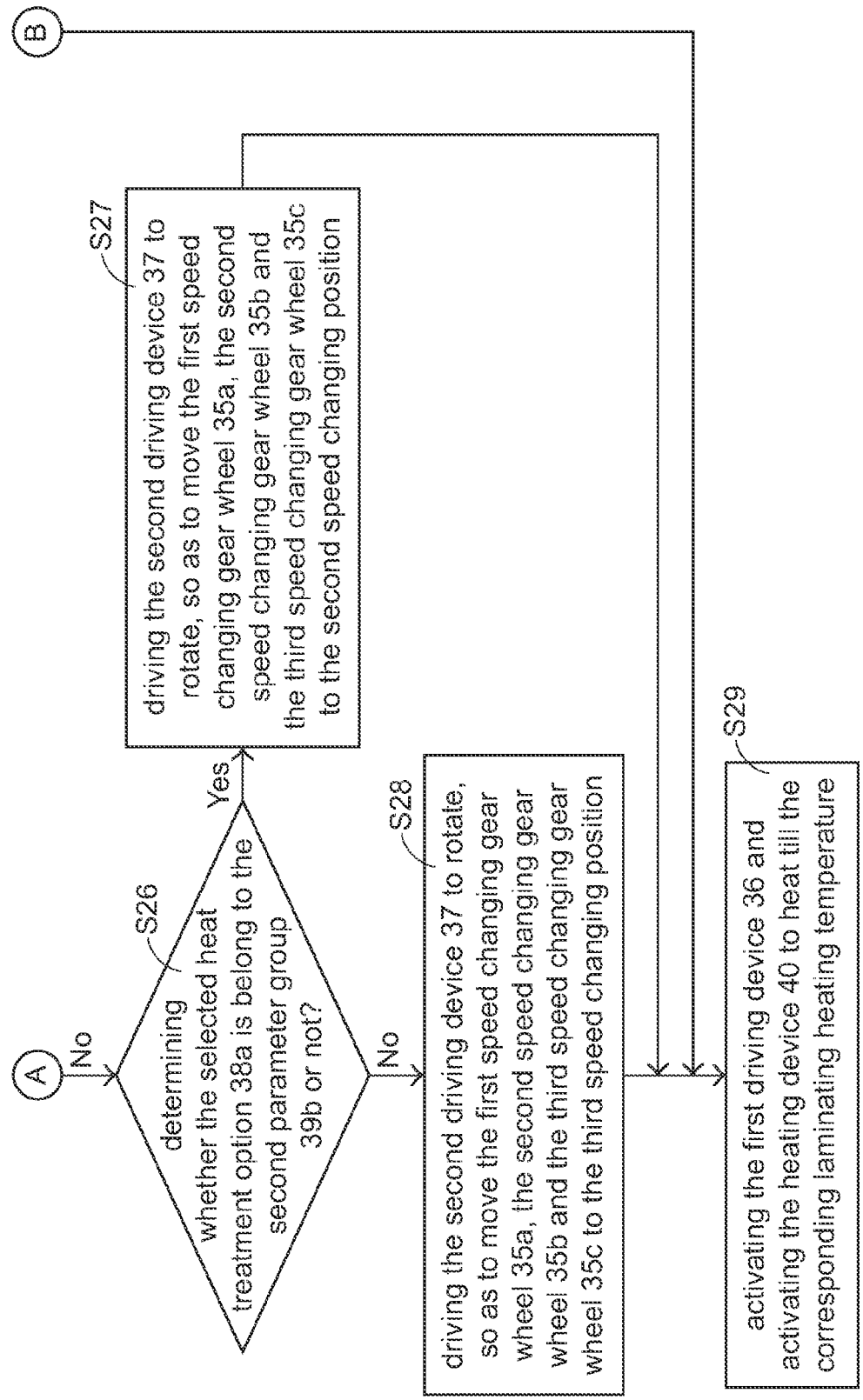

An operation process of the second embodiment of the present invention is illustrated herein after. Referring to FIG. 13 to FIG. 18B together, wherein FIG. 18A and FIG. 18B illustrates a flow chart of the controller of the laminator according to a second embodiment of the present invention.

After the user selects one of the heat treatment options 38a or the cold treatment option 38b by using the input interface 38, the controller 39 processes a step S21 to determine whether the cold treatment option 38b is selected or not. If the cold treatment option 38b is selected, then the controller 39 determines that the first roller set 32 and the second roller set 33 need to be rotated with the first laminating rotational speed S'1 without being heated. Hence, the controller 39 processes a step S22 to drive the second driving device 37 to rotate, so as to move the first speed changing gear wheel 35a, the second speed changing gear wheel 35b and the third speed changing gear wheel 35c to the first speed changing position as illustrated in FIG. 15. After that, the controller 39 stops to drive the second driving device 37 to rotate and then processes a step S23 to activate the first driving device 36 and stop to drive the heating device 40. At the moment, the first roller set 32 and the second roller set 33 rotate with the first laminating rotational speed S'1.

If the controller 39 determines that the cold treatment option 38b is not selected at the step S21, then the controller 39 processes a step S24 to determine whether the selected heat treatment option 38a is belong to the first parameter group 39a or not. If the selected heat treatment option 38a is belong to the first parameter group 39a, for example the heat treatment option 38a marked as the scale 1 is selected, then the controller 39 determines that the first roller set 32 and the second roller set 33 need to be rotated with the first laminating rotational speed S'1, and the heating device 40 needs to heat the first roller set 32 and the second roller set 33 till 110 degrees. Therefore, the controller 39 processes a step S25 to drive the second driving device 37 to rotate, so as to move the first speed changing gear wheel 35a, the second speed changing gear wheel 35b and the third speed changing gear wheel 35c to the first speed changing position as illustrated in FIG. 15. After that, the controller 39 stops to drive the second driving device 37 to rotate and then processes a step S29 to activate the first driving device 36 and activate the heating device 40 to heat till the corresponding laminating heating temperature. And thus, the first roller set 32 and the second roller set 33 rotate with the first laminating rotational speed S'1 and are heated till 110 degrees.

If the controller 39 determines that the selected heat treatment option 38a is not belong to the first parameter group 39a at the step S24, then the controller 39 processes a step S26 to determine whether the selected heat treatment option 38a is belong to the second parameter group 39b or not. If the selected heat treatment option 38a is belong to the second parameter group 30b, for example the heat treatment option 38a marked as the scale 7 is selected, then the controller 39 determines that the first roller set 32 and the second roller set 33 need to be rotated with the second laminating rotational speed S'2, and the heating device 40 needs to heat the first roller set 32 and the second roller set 33 till 120 degrees. Therefore, the controller 39 processes a step S27 to drive the second driving device 37 to rotate, so as to move the first speed changing gear wheel 35a, the second speed changing gear wheel 35b and the third speed changing gear wheel 35c to the second speed changing position as illustrated in FIG. 16. After that, the controller 39 stops to drive the second driving device 37 to rotate and then processes a step S29 to activate the first driving device 36 and activate the heating device 40 to heat till the corresponding laminating heating temperature. And thus, the first roller set 32 and the second roller set 33 rotate with the second laminating rotational speed S'2 and are heated till 120 degrees.

If the controller 39 determines that the selected heat treatment option 38a is not belong to the second parameter group 39b at the step S26, for example the heat treatment option 38a marked as the scale 13 is selected, then the controller 39 determines that the first roller set 32 and the second roller set 33 need to be rotated with the third laminating rotational speed S'3, and the heating device 40 needs to heat the first roller set 32 and the second roller set 33 till 130 degrees. Therefore, the controller 39 processes a step S28 to drive the second driving device 37 to rotate, so as to move the first speed changing gear wheel 35a, the second speed changing gear wheel 35b and the third speed changing gear wheel 35c to the third speed changing position as illustrated in FIG. 17. After that, the controller 39 stops to drive the second driving device 37 to rotate and then processes the step S29 to activate the first driving device 36 and activate the heating device 40 to heat till the corresponding laminating heating temperature. And thus, the first roller set 32 and the second roller set 33 rotate with the third laminating rotational speed S'3 and are heated till 130 degrees.

According to the above mentioned embodiments, it is understood that the present invention provides a combination of the transmission gear set, the speed changing gear set, the first driving device, the second driving device, the input interface, the controller and the heating device, and thus the laminator can automatically adjust the rotational speed and the heating temperature of the first roller set and the second roller set according to different film thicknesses.

As the above mentioned descriptions, the controller of the present invention automatically determines the required rotational speed and heating temperature of the first roller set and the second roller set according to the option that the user selects by using the input interface. Therefore, the location of the gear wheel does not need to be adjusted by the user manually, so as to significantly reduce the probability of adjusting function failure due to improper operation of the user.

In addition, when the film thickness is out of the range of the first parameter group, the controller reduces the rotational speed of the first roller set and the second roller set without increasing the heating temperature. Therefore, the probability of melt damage of the laminator is reduced.

Besides, when the film thickness is smaller, the controller enhances the rotational speed of the first roller set and the second roller set, and thus the heating temperature is reduced. Therefore, the required heating and laminating time is reduced.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A laminator with changeable rotation speed and heating temperature capable of laminating two films and an object disposed between the two films together, wherein the laminator comprises:
 a first roller set, capable of clipping and delivering the two films and the object, so as to laminate the two films and the object together;
 a transmission gear set, connected with the first roller set;
 a speed changing gear set, connected with the transmission gear set;
 a first driving device, connected with the speed changing gear set and capable of providing a motive power to the first roller set;
 a second driving device, connected with the speed changing gear set and capable of moving the speed changing gear set to a plurality of speed changing positions, so as to rotate the first roller set with a plurality of rotational speeds;
 a heating device, capable of heating the first roller set;
 an input interface, having a plurality of heat treatment options capable of being selected; and
 a controller, the controller comprising a plurality of parameter groups, each of the parameter groups corresponding to a plurality of the heat treatment options, each of the parameter groups corresponding to a laminating rotational speed and a laminating heating temperature range of the first roller set, each of the parameter groups corresponding to the same laminating heating temperature range of the first roller set, each of the heat treatment options corresponding to a laminating heating temperature within the laminating heating temperature range, wherein the controller controls the heating device heating the first roller set to one of the laminating heating temperatures within the laminating heating temperature range corresponding to a selected one of the heat treatment options and drives the second driving device to move the speed changing gear set to one of the speed changing positions, so as to rotate the first roller set with one of the laminating rotational speeds corresponding to the selected one of the heat treatment options, and the plurality of heat treatment options of each of the parameter groups respectively correspond to the different laminating heating temperatures within the laminating heating temperature range.

2. The laminator with changeable rotation speed and heating temperature as claimed in claim 1, wherein each of the heat treatment options corresponds to a film thickness.

3. The laminator with changeable rotation speed and heating temperature as claimed in claim 2, wherein the controller comprises a first parameter group and a second parameter group, numbers of the heat treatment options that the first parameter group and the second parameter group respectively corresponding to are the same, the first parameter group corresponds to a first laminating rotational speed of the first roller set, while the second parameter group corresponds to a second laminating rotational speed of the first roller set, and the first laminating rotational speed is larger than the second laminating rotational speed.

4. The laminator with changeable rotation speed and heating temperature as claimed in claim 3, wherein the input interface further comprises a cold treatment option, and the cold treatment option corresponds to the first laminating rotational speed of the first roller set.

5. The laminator with changeable rotation speed and heating temperature as claimed in claim 4, wherein the first roller set comprises two first rollers and a first gear wheel.

6. The laminator with changeable rotation speed and heating temperature as claimed in claim 5, further comprises a second roller set capable of clipping and delivering the two films and the object coming from the first roller set, wherein the second roller set comprises two second rollers and a second gear wheel.

7. The laminator with changeable rotation speed and heating temperature as claimed in claim 6, wherein the first driving device comprises a driving gear wheel.

8. The laminator with changeable rotation speed and heating temperature as claimed in claim 7, wherein the second driving device comprises a first connecting component and a second connecting component, a first end of the first connecting component is pivoted to the second driving device, a second end of the first connecting component passes through a first end of the second connecting component, and a second end of the second connecting component connects with the speed changing gear set.

9. The laminator with changeable rotation speed and heating temperature as claimed in claim 8, wherein the transmission gear set comprises a first transmission gear wheel, a second transmission gear wheel and a first shaft, a diameter of the second transmission gear wheel is larger than a diameter of the first transmission gear wheel, the first transmission gear wheel and the second transmission gear wheel respectively pass through two ends of the first shaft, and the second transmission gear wheel engages with the first gear wheel and the second gear wheel.

10. The laminator with changeable rotation speed and heating temperature as claimed in claim 9, wherein the speed changing gear set comprises a first speed changing gear wheel, a second speed changing gear wheel and a second shaft, a diameter of the first speed changing gear wheel is larger than a diameter of the second speed changing gear wheel, the first speed changing gear wheel and the second speed changing gear wheel pass through the second shaft, and the first speed changing gear wheel engages with the driving gear wheel of the first driving device.

11. The laminator with changeable rotation speed and heating temperature as claimed in claim 10, wherein when the second driving device moves the speed changing gear set to a first speed changing position, the first speed changing gear wheel engages with the first transmission gear wheel, and the first roller set and the second roller set rotate with the first laminating rotational speed, while when the second driving device moves the speed changing gear set to a second speed changing position, the second speed changing gear wheel engages with the second transmission gear wheel, and the first roller set and the second roller set rotate with the second laminating rotational speed.

12. The laminator with changeable rotation speed and heating temperature as claimed in claim 11, further comprises a first sensor capable of sensing whether the speed changing gear set is moved to the first speed changing position or not, and a second sensor capable of sensing whether the speed changing gear set is moved to the second speed changing position or not.

13. The laminator with changeable rotation speed and heating temperature as claimed in claim 11, wherein a side edge of each of teeth of the first transmission gear wheel, the second transmission gear wheel, the first speed changing gear wheel and the second speed changing gear wheel further comprises two chamfers, so as to smoothly engage the first speed changing gear wheel and the second speed changing gear wheel with the first transmission gear wheel and the second transmission gear wheel.

14. The laminator with changeable rotation speed and heating temperature as claimed in claim 2, wherein the controller comprises a first parameter group, a second parameter group and a third parameter group, numbers of the heat treatment options that the first parameter group, the second parameter group and the third parameter group respectively corresponding to are the same, the first parameter group corresponds to a first laminating rotational speed of the first roller set, the second parameter group corresponds to a second laminating rotational speed of the first roller set, the third parameter group corresponds to a third laminating rotational speed of the first roller set, and the first laminating rotational speed is larger than the second laminating rotational speed, the second laminating rotational speed is larger than the third laminating rotational speed.

15. The laminator with changeable rotation speed and heating temperature as claimed in claim 14, wherein the input interface further comprises a cold treatment option, and the cold treatment option corresponds to the first laminating rotational speed of the first roller set.

16. The laminator with changeable rotation speed and heating temperature as claimed in claim 15, wherein the first roller set comprises two first rollers and a first gear wheel.

17. The laminator with changeable rotation speed and heating temperature as claimed in claim 16, further comprises a second roller set capable of clipping and delivering the two films and the object coming from the first roller set, wherein the second roller set comprises two second rollers and a second gear wheel.

18. The laminator with changeable rotation speed and heating temperature as claimed in claim 17, wherein the first driving device comprises a driving gear wheel.

19. The laminator with changeable rotation speed and heating temperature as claimed in claim 18, wherein the second driving device connects with the speed changing gear set.

20. The laminator with changeable rotation speed and heating temperature as claimed in claim 19, wherein the transmission gear set comprises a first transmission gear wheel, a second transmission gear wheel, a third transmission gear wheel and a first shaft, a diameter of the second transmission gear wheel is larger than a diameter of the first transmission gear wheel, a diameter of the third transmission gear wheel is larger than a diameter of the second transmission gear wheel, all of the first transmission gear wheel, the second transmission gear wheel and the third transmission gear wheel pass through the first shaft, and the second transmission gear wheel engages with the first gear wheel and the second gear wheel.

21. The laminator with changeable rotation speed and heating temperature as claimed in claim 20, wherein the speed changing gear set comprises a first speed changing gear wheel, a second speed changing gear wheel, a third speed changing gear wheel and a second shaft, a diameter of the first speed changing gear wheel is larger than a diameter of the second speed changing gear wheel, a diameter of the second speed changing gear wheel is larger than a diameter of the third speed changing gear wheel, all of the first speed changing gear wheel, the second speed changing gear wheel and the third speed changing gear wheel pass through the second shaft, and the first speed changing gear wheel engages with the driving gear wheel of the first driving device.

22. The laminator with changeable rotation speed and heating temperature as claimed in claim 21, wherein when the second driving device moves the speed changing gear set to a first speed changing position, the first speed changing gear wheel engages with the first transmission gear wheel, and the first roller set and the second roller set rotate with a first laminating rotational speed, when the second driving device moves the speed changing gear set to a second speed changing position, the second speed changing gear wheel engages with the second transmission gear wheel, and the first roller set and the second roller set rotate with a second laminating rotational speed, while when the second driving device moves the speed changing gear set to a third speed changing position, the third speed changing gear wheel engages with the third transmission gear wheel, and the first roller set and the second roller set rotate with a third laminating rotational speed.

23. The laminator with changeable rotation speed and heating temperature as claimed in claim 22, wherein a side edge of each of teeth of the first transmission gear wheel, the second transmission gear wheel, the third transmission gear wheel, the first speed changing gear wheel, the second speed changing gear wheel and the third speed changing gear wheel further comprises two chamfers, so as to smoothly engage the first speed changing gear wheel, the second speed changing gear wheel and the third speed changing gear wheel with the first transmission gear wheel, the second transmission gear wheel and the third transmission gear wheel.

* * * * *